United States Patent
Greenfield et al.

(10) Patent No.: US 8,271,324 B2
(45) Date of Patent: Sep. 18, 2012

(54) SMALL STORE SYSTEM

(75) Inventors: Steven J. Greenfield, Palm Harbor, FL (US); Darren Moss, Chicago, IL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 318 days.

(21) Appl. No.: 12/623,482

(22) Filed: Nov. 23, 2009

(65) Prior Publication Data

US 2010/0131348 A1    May 27, 2010

Related U.S. Application Data

(60) Provisional application No. 61/117,153, filed on Nov. 22, 2008.

(51) Int. Cl.
*G06Q 30/00* (2012.01)
(52) U.S. Cl. .................................. 705/14.1
(58) Field of Classification Search ............ 705/14.1
See application file for complete search history.

(56) References Cited

U.S. PATENT DOCUMENTS

| | | | |
|---|---|---|---|
| 6,314,406 B1 * | 11/2001 | O'Hagan et al. .......... 705/14.23 |
| 6,869,013 B2 | 3/2005 | Allen et al. |
| 7,349,884 B1 | 3/2008 | Odom et al. |
| 2003/0187685 A1 | 10/2003 | Bakker |
| 2003/0205617 A1 | 11/2003 | Allen et al. |
| 2004/0044575 A1 | 3/2004 | Bakker et al. |
| 2004/0049425 A1 | 3/2004 | Allen et al. |
| 2005/0023346 A1 | 2/2005 | Bakker et al. |
| 2005/0139655 A1 | 6/2005 | Bakker et al. |
| 2005/0271446 A1 | 12/2005 | Minowa |
| 2006/0091203 A1 | 5/2006 | Bakker et al. |
| 2008/0154676 A1 | 6/2008 | Suk |
| 2009/0026255 A1 | 1/2009 | Besecker et al. |

FOREIGN PATENT DOCUMENTS

| | | |
|---|---|---|
| KR | 10-2005-0018737 | 2/2005 |
| WO | WO 02/091281 | 11/2002 |
| WO | WO 03/083754 | 10/2003 |
| WO | WO 03/096148 | 11/2003 |
| WO | WO 2004/021116 | 3/2004 |
| WO | WO 2004/021297 | 3/2004 |
| WO | WO 2004/111779 | 12/2004 |

OTHER PUBLICATIONS

Claims filed Nov. 23, 2009 in U.S. Appl. No. 12/623,482.
Claims filed Nov. 23, 2009 in U.S. Appl. No. 12/623,498.
Claims filed Nov. 23, 2009 in U.S. Appl. No. 12/623,517.
Claims filed Nov. 20, 2009 in application PCT/US09/65400.
Espacenet English translation of Abstract of KR 20050018737.
PCT ISR for PCT/US2009/065400 mailed Jun. 22, 2010.
PCT Written Opinion for PCT/US2009/065400 mailed Jun. 22, 2010.

* cited by examiner

*Primary Examiner* — Daniel Lastra
(74) *Attorney, Agent, or Firm* — Pillsbury Winthrop Shaw Pittman LLP

(57) ABSTRACT

System and methods of use are discloses that default routing of an ID read by an ID reader as part of a purchase transaction in a retail store, to a first computer system (MCS) instead of the POS computer system for the retail store, the first computer system processes the ID, and the POS computer system receives the results of the processing in the form of a IDs recognizable by the POS computer system and for which the POS computer system has associated costs.

21 Claims, 16 Drawing Sheets

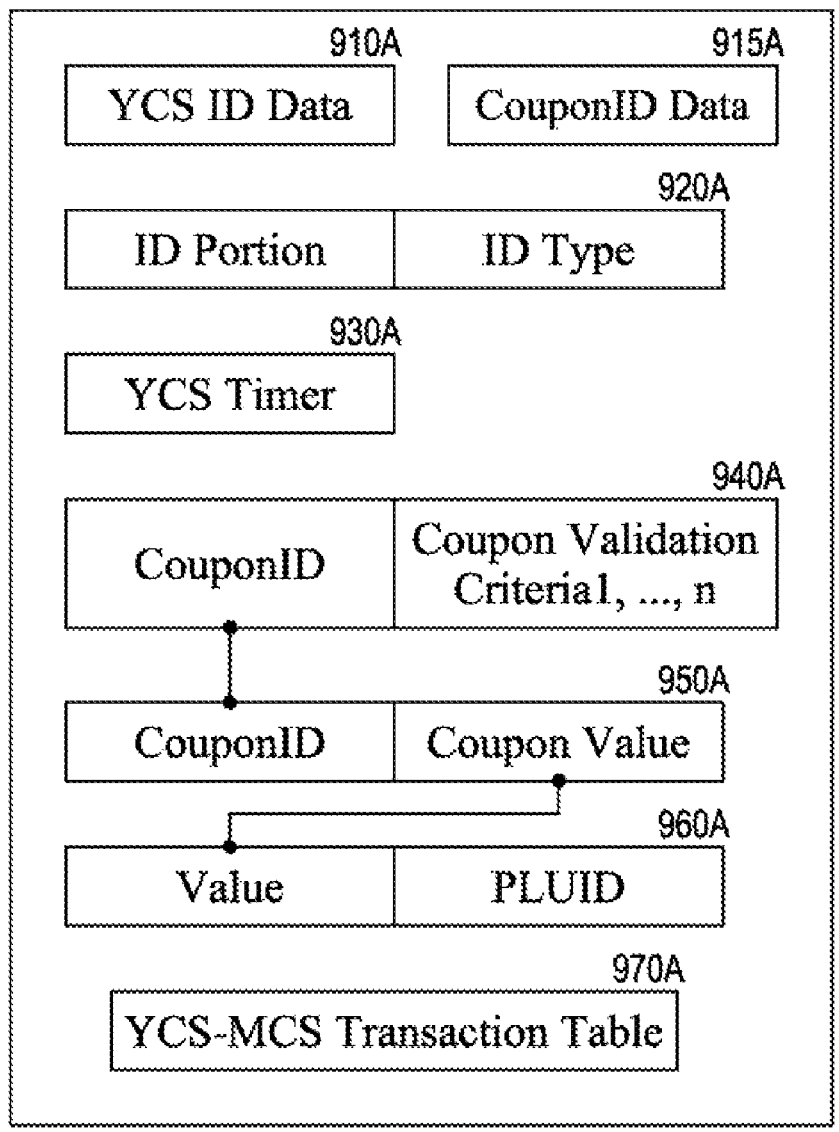
FIG. 9A   YCS Related Block 810

1140 (MCS Customer I / O Algorithm 920E)

| PID1 | COST1 | 1410 |
| --- | --- | --- |
| . | . | |
| . | . | |
| . | . | |
| PIDn | COSTn | |
| PLUID1 | COSTn+1 | |
| PLUID2 | COSTn+2 | |
| PLUID3 | COSTn+3 | |
| PLUID4 | COSTn+4 | |

1420

| PIDn | |
| --- | --- |
| PLUID1 | 10000 |
| PLUID2 | 10000 |
| PLUID3 | 10000 |
| PLUID4 | 10000 |

1430

| PIDn | Sugar |
| --- | --- |
| PLUID1 | Coupon1 |
| PLUID2 | Coupon2 |
| PLUID3 | Coupon3 |
| PLUID4 | Coupon4 | ent
SMALL STORE SYSTEM

PRIORITY

This application claims priority to provisional application No. 61/117,153, filed Nov. 22, 2008, the entirety of which are incorporated herein by reference.

FIELD OF THE INVENTION

The field of the invention is point of sale computer systems.

ACRONYMS AND ABBREVIATIONS USED HEREIN

POS—Point of Sale
UPC—Universal Product Code
RS—Retail Store
PLU—Price Look Up
EOR—End of Receipt
RF—Radio Frequency
CS—Computer System
MCS—Marketing Computer System
YCS—Y Computer System
POSCS—Point of Sale Computer System
CCS—Central Computer System
CPU—Central Processing Unit
I/O—Input Output
RAM—Random Access memory
ID—Identification
TID—Transaction Identification
CID—Consumer Identification
RSID—Retail Store Identification
PID—Product Identification
PayloadID—Payload Identification
PLUID Price Look Up Identification
CouponID—Coupon Identification
PIN—Personal Identification Number

DEFINITIONS USE HEREIN

A POS means a location where a transaction occurs.

UPCs mean any set of codes each one uniquely identifying a product such that each UPC constitutes a PID.

A RS means a physical location where consumers come to purchase and receive goods from a merchants.

A PLU means a data structure in a computer memory storing in association with one another, ID, such as HD, and price.

A CS means one or more computers having commonly accessible data storage.

A computer means at least an input for inputting data, a central processing unit for processing digital data, a memory for storing digital data, and an output for outputting data.

Digital data means data stored in the form of discrete digits.

A POSCS is a CS designed at least to log purchase transactions occurring for a retail store at one or more POS, and to track inventory for the retail store.

A CCS is a CS designed to communicate with a plurality of spatially remote CS to provide data updates to the spatially remote computers, and to receive data updates from the spatially remote computers.

A TID is an ID assigned to a transaction.

A CID is an identification association with a person instead of a product or coupon.

A PID is an identification of a type of product, typically physically on the packaging of each item of the type of product, such as a symbology representing a UPC.

CouponID means an ID associated with coupon criteria, such as coupon value and coupon terms and conditions.

A PLUID is a value in the ID field or a record in a PLU data structure.

Herein, PLUID specifically means an ID not associated in a POSCS memory with a product sold in the corresponding RS, but which is associated with a cost value in the POSCS memory.

Herein, PLUID also specifically means a value stored in a MCS memory in association with one or more couponIDs.

A PayloadID is an ID associated with data which is associated with result of processing. PayloadID may define the data for transmission of data specifying printing or presentation of a coupon or marketing material to a customer, information specifying the value of a coupon, or information specifying printing instructions for printing information or a coupon.

An ID reader means a device to read IDs associated with items, such as packaged goods and preferably also capable of reading IDs associated with customers, such as CIDs symbolized in customer items, frequent shopper cards or credit cards, and cell phone number or other digital device ID.

A radio frequency ID reader is a device for reading radio frequency IDs.

An optical reader means a device for reading data optically.

A scanner is one class of optical ID readers.

A symbology is a specification how to express symbols or signs, such as numeric or alphabetical data.

A bar code symbology expresses alphabetical information and or numerical information as parallel vertical lines in which variation in at least some of line width, color, and spacing encode information.

A bar code means data (such as an alphanumeric value) encoded in a particular bar code symbology.

Bar code scanners are a subset of optical scanners. Bar code scanners are designed to read data optically encoded in an optical symbology of bar codes.

Coupon criteria mean conditions that must be satisfied for a currency amount with which a couponID is associated to entitle a transaction to a discount on the value of the transaction equal to the currency amount when the couponID is associated with the transaction.

OBJECTS

It is an object to provide targeted information to a purchaser at a POS.

It is another object to provide targeted coupons to a purchaser at the POS.

Further objects are to automate the provision of targeted information and coupons to a purchaser at a POS, to limit involvement of store employees in provision of targeted information and coupons, limit the opportunity for couponing fraud, and limit modifications of existing POSCSs to accomplish all objects.

SUMMARY OF THE INVENTION

These and other objects are provided by the following elements: (1) a novel MCS; (2) novel data in memory of a POSCS; (3) a novel YCS; (4) an ID reader; (5) a CCS; and (6) a network connecting the MCS to the CCS, by system configurations of these elements, and by methods of use of these elements. Several of the novel elements and methods limited to their individual use have separate utility and are independently patentable.

System configurations have in common designs that default routing of an ID read by the ID reader to the MCS instead of the POSCS, and the MCS processing the ID. System configurations have in common designs that eventually route data representing an ID read by the ID reader, in a specification useable by the POSCS, from the YCS to the POSCS, wherein the routed ID is an ID provided by the MCS in response to receipt by the MCS of the ID read by the ID reader and determinations by the MCS whether the ID it received meets certain conditions.

Methods have in common:

the ID reader reading an ID;

the ID reader routing the read ID read from the ID reader either (1) to both the YCS and the MCS or (2) only to the YCS, in which case the YCS routes the read ID to the MCS; and the YCS transmitting an ID to the POSCS wherein the ID the YCS transmits to the POS depends upon a signal transmitted by the MCS to the YCS in response to routing of the read ID to the MCS.

Additional method steps include:

in response to the MCS receiving the read ID, the MCS determining whether to transmit to the YCS an MCS response containing either a response ID or no ID;

the YCS determining a YCS response determination, wherein the YCS response determination indicates:

whether the MCS response contains a response ID;

whether MCS response contains no ID;

whether no response is received by the YCS from the MCS in a specified period of time (a time out period) after receipt by the YCS of the read ID or routing of the read ID to the MCS;

the YCS acts upon the YCS response determination as follows:

if the YCS response determination is that the MCS response contains a response ID, the YCS transmits the response ID to the POSCS;

if the YCS response determination is that the MCS response contains no ID, the YCS transmits the read ID to the POSCS;

if the YCS receives no YCS response within the specified time out period, the YCS performs a transmit process, which either transmits the read ID to the POSCS or processes the read ID to obtain a processed ID and transmits the processed ID to the POSCS.

The foregoing enable a POSCS to process transactions in which couponIDs are presented for redemption during a purchase transaction without the POSCS storing those couponIDs, without the POSCS storing terms and conditions for those coupons, and without the POSCS running algorithms to determine whether to issue a discount value associated with a coupon presented for redemption during a purchase transaction. Instead, the POSCS stores in its existing PLU data structure a limited number of additional PLUs, each of which has an associated value. The MCS stores couponIDs and determines whether to issue a discount to a transaction upon receipt of a couponID, and if so, transmits a PLUID having a value corresponding to the value associated in the MCS memory the couponID, to the YCS which then transmits that PLUID to the POSCS. Upon processing the transaction, the POSCS looks up in its PLU data structure the value associated with the PLUID and adds that value to the total currency charge for the transaction. As a consequence, POSCS software and memory structures need not be modified to enable processing of coupons and similar marketing material.

An additional option is providing the MCS with a means to determine when a transaction ends. For example, the MCS may have an input from a sensor on the cash register draw indicting when the drawer opens, indicating end of transaction. For example, the MCS may have an input from an output of a POS printer that prints a register receipt. Other mechanisms exist to either know, or assume when a transaction ends. End of transaction is useful information for the MCS to perform some optional processing, such as when condition for a coupon discount depends upon the presence of one or more product IDs in the same or a prior transaction, and to log transaction data in the MCS, associated by transaction. In one example, the MCS has an input from an output of the POSCS designed to transmit register receipt information. In this example, the POSCS transaction register receipt output information is also routed to the MCS. This is one mechanism to enable the MCS to determine when a transaction ends.

An additional option is the inclusion of a MCS Customer I/O to communicate to and from the customer at the POS. Specifically, this allows for customer input, for example to confirm age, as a precondition for the MCS output issuing a coupon or specified communication for products having age limitations, such as products for alcohol and tobacco. Another alternative would be a card reader input for reading an identification provided on a card presented by the consumer. For example, a consumer using a check or debit card for a transaction might have to have their card read by credit card transaction reader at the POS (not shown) and might be requested by the MCS output to swipe or have read, the same card, again, in the MCS input, for purposes of the MCS obtaining a CID for that transaction.

Another significant option is the transmission from the MCS Customer I/O of information to the customer about future discounts. For example the MCS Customer I/O may communicate that the customer will receive an instant discount upon the customer's next purchase, or next purchase meeting certain criteria. This communication could be independent of the presentation by the customer of any couponID or other item at the customer's next transaction. In this option, the MCS stores in its memory the customer ID and terms and conditions for the instant discount, and if those terms and conditions are met, transmits a PLUID associated with the amount of the instant discount to the POSCS as here after described.

An additional option is the transmission from the YCS to the MCS of a time out signal indicating that the aforementioned specified time out period has expired, and the MCS programmed to respond to such a signal by not sending an ID to the YCS until after receipt by the MCS of a new ID.

Another option is the inclusion in the MCS of a means to use the MCS Customer I/O to notify the store clerk that the YCS is offline. For example, the MCS may be programmed to "ping" the YCS (send a datum to the YCS) and take no action if the YCS returns a predetermined signal with a time out period, but to generate an audio signal on an audio output of the MCS Customer I/O noting that the YCS was not responding or otherwise notifying the store clerk audibly, prompting action to resolve the YCS non response.

An additional option is the provision of network connectivity from the MCS to a CCS and transmission of couponIDs, and optionally coupon terms and conditions, and software updates, from the CCS to the MCS. The inventors contemplate plural MCS in a RS, at least one MCS for each POS in the RS.

An additional option is the transmission of transaction data from at least one of the MCSs in a RS to the CCS and the CCS determining whether transaction data meets terms and conditions of coupons, and conditions for offering coupons, and transmitting corresponding data back to at least one of the MCSs in the RS.

An additional and preferred option, is the YCS including type filter data enabling it to filter out CID and couponID data from transmission by it to the POSCS. For example, if type data is specified by the leading two digits of 15 digit representations of IDs, then the YCS may store values for the leading two digits (4 possible values) and be hard wired to block or coded to not transmit IDs with leading two digits corresponding to the CID and couponID values to the POSCS. This enables customers to have the ID reader read both couponIDs and CIDs even though the POSCS may not be designed to handle such data, and enable the MCS to effectively use that data for marketing and other purposes.

Preferably, the process of converting a conventional POSCS system to a system capable of crediting discounts in the manner discussed herein comprises, unplugging from the POSCS socket a cable connecting to a bar code scanner, plugging in a plug of a Y cable to that socket, plugging in a terminal of the Y cable to the socket of the bar code scanner, plugging in a terminal of the Y cable to a socket of the MCS, configuring the MCS as noted herein, configuring the YCS in the Y cable as noted herein, and updating the memory of the MCS to store associations of couponIDs with PLUIDs, and updating the POSCS to store in its PLU lookup table (for COST of items), PLUIDs in the PID field and COST values in the COST field.

Preferably, a method of use for processing the transaction of a customer comprises sequentially scanning bar codes with a bar code scanner on product items the customer desires to purchase in the transaction and on coupons the customer wishes to redeem as part of the transaction, routing via a Y cable the data defining the PID and couponIDs scanned by the bar code scanner to the MCS, in response to receipt of each datum defining an ID by the MCS, the MCS: transmitting to the YCS in the Y cable data defining the PID if the ID datum received by the MCS defined a PID; transmitting to the YCS a PLUID if the ID datum received by the MCS was a couponID and the MCS validated the couponID; if the ID datum received by the MCS defined either a couponID or a CID, not transmitting the couponID or the CID to the YCS; the YCS forwarding ID datum it received from the MCS to the POSCS; the POSCS determining the cost to associate with a PLUID received from the YCS via the Y cable by looking up cost value associated in the POSCS memory with that PLUID; the POSCS transmitting transaction data including item descriptions, item prices, and transaction total via an output to a POSCS printer and the MCS, and the POSCS printer printing the register receipt for the transaction, and the MCS determining that the transaction has ended.

ASPECTS OF THE INVENTION

One first aspect is a system and methods for its use in processing transactions for a retail store comprising:

a bar code scanner for reading IDs represented by bar codes, bar code scanner located at a POS of said retail store;

a Y device, such as a cable or wireless transmission structure, including a YCS, said YCS comprising a YCS CPU and YCS memory;

an MCS, said MCS comprising an MCS CPU and MCS memory;

a POSCS, said POSCS comprising a POSCS CPU and POSCS memory;

a POS printer, said POS printer located at said POS;

wherein said Y device has one end connected to said bar code scanner, one end connected to said MCS, and one end connected to said POSCS;

said POSCS has an output (wireless or cable) connected to both said POS printer and an input of said MCS so that said MCS receives signals transmitted by said POSCS to said POS printer; and wherein said Y device routes data defining IDs read by said bar code scanner to said MCS, transmits IDs received from said MCS to said POSCS, and transmits data defining the IDs read by said bar code scanner to said POSCS if said YCS determines that said MCS is non responsive to data sent from said YCS to said MCS;

wherein said MCS receives IDs from said YCS and transmits IDs to said YCS such that, if an ID received by said MCS is a PID, said MCS transmits the same ID back to said YCS, and if the ID received by said MCS is a couponID, said MCS transmits a PLUID associated in said MCS memory with said couponID, to said YCS, and wherein said PLUID and said couponID are different from one another; and wherein said POSCS stores in said POSCS memory cost values in association with PLUIDs and cost values in association with PIDs, and totals the cost for a transaction including a specified PLUID using the corresponding cost value stored in said POSCS memory for that specified PLUID.

Dependent aspects of this aspect include:

wherein said MCS is configured to determine end of transaction;

wherein, if an ID received by said MCS from said YCS is a CID, the MCS is configured to not transmit said ID back to said YCS;

wherein, if an ID received by said MCS from said YCS is a CID, said MCS is configured to instruct said YCS to not transmit said ID to said POSCS;

further comprising an MCS printer connected to the MCS and configured for printing marketing communications;

wherein said MCS memory stores plural couponID each in association with a PLUID, and wherein the number of distinct couponIDs exceeds the number of distinct PLUIDs.

wherein said MCS transmits PLUIDs to said YCS in the same digital specification for alphanumeric or numeric information in which the MCS transmits PIDs to said YCS.

further comprising a customer input device connected to said MCS for receiving input from a customer at the POS.

A second aspect is a system and method for using an MCS for processing purchase transaction data, said MCS comprising:

an MCS CPU for processing digital data;

an MCS first input for receiving digital data defining IDs read by an ID reader;

an MCS second input for receiving digital data defining register receipt information;

an MCS first output for outputting digital data defining IDs;

a data structure in said MCS storing plural couponIDs, each such couponID in association with a corresponding PLUID, said data structure including a first couponID in association with a first PLUID, wherein said first couponID is different from said PLUID;

code in said MCS for execution by said MCS CPU for transmitting to said MCS first output digital data defining: (1) if digital data defining an ID received by said MCS first input defines a PID, said ID; and (2) if digital data defining said ID received by said MCS first input defines said first couponID, said first PLUID.

A third aspect is a system and method for using a YCS for routing transaction data to a POSCS when a MCS is not responding, said YCS comprising:
 a YCS CPU for processing digital data;
 a YCS first input for receiving digital data defining IDs read by an ID reader;
 a YCS first output for outputting to the MCS digital data defining IDs received by said YCS first input;
 a YCS second input for receiving digital data defining IDs from the MCS;
 a YCS second output for transmitting digital data defining IDs to the POSCS;
 code in said YCS for execution by said YCS CPU for transmitting to said YCS first output, digital data defining IDs received by said YCS first input; and
 code in said YCS for execution by said YCS CPU for transmitting digital data defining a received ID, received by said YCS first input, to said YCS second output, when said YCS second input receives no digital data defining an ID within a timeout period after when said YCS first output transmits digital data defining said received ID;
 code in said YCS for execution by said YCS CPU for transmitting to said YCS second output digital data defining an ID received by said YCS second input within said timeout period.

BRIEF DESCRIPTION OF THE DRAWINGS

Components, data structures, and algorithms will be described in connection with the following figures.
FIG. 9A shows data structures in YCS related block 810 of MCS memory 750.

DETAILED DESCRIPTION OF THE EMBODIMENTS

Figure 1:
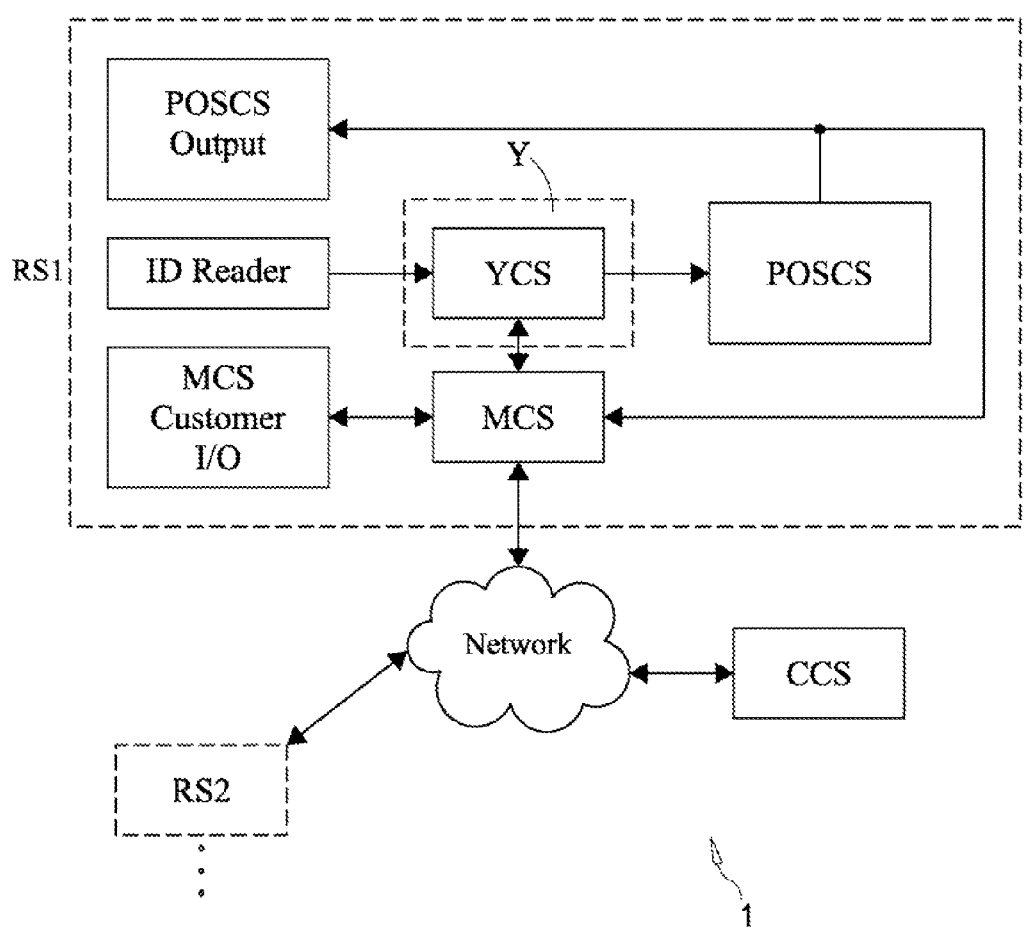
FIG. 1 is an overview of network system 1.

FIG. 1 shows system 1 including a plurality of RSs, a Network, and a CCS.

FIG. 1 also shows a first RS, RS1, including an ID reader, a POSCS output, an MCS customer I/O, a YCS, a MCS, and a POSCS. Lines in FIG. 1 connecting elements represent data connections and arrow heads on lines indicate direction or directions of data flow. FIG. 1 also shows structure "Y" in dashed lines, including the data connections and the YCS. The enclosed Y structure may be physically a Y cable, which is a cable having a branch. The Y structure, cable or other regions, disclosed herein, also contain the YCS.

In FIG. 1, each line for data connection may by represented physically by a parallel, serial, or wireless transmission or reception structure, operating in a determined specification, such as RS-232, USB, IEEE parallel standard, TCP/IP, Bluetooth, and various WIFI protocols.

RS1 is shown by dashed lines indicating that the RS includes the ID reader, POSCS output, MCS Customer I/O, YCS, MCS, and POSCS.

Although preferable, the actual CPU or memory of the MCS or POSCS need not be located within the physical premises of walls of RS1. These system elements should be provided in proximity to the POS to reduce cost for cabling, or reduce required wireless transmission power and to avoid wireless cross talk and interference.

The ID reader must be at the POS so that it can read codes on product items presented at the POS for sale. The POSCS Output must be able to convey signals to the POS location. The MCS Customer I/O, if present, must be able to convey signals to the customer at the POS and receive data from the customer at the POS.

In FIG. 1, ID data read by the ID reader is routed to the YCS which receives that data. The YCS and the MCS route data to and receive data from one another. The YCS routes data to the POSCS which receives that data. The POSCS routes data to the POSCS output which receives that data. The MCS and the MCS Customer I/O route data to and receive data from one another. The MCS and CCS route data to and from one another via the Network.

Each RS may have a plurality of POSs each of which may have its own POSCS Output, ID reader, and MCS Customer I/O. However, each POS must have a corresponding YCS and MCS to receive, process, and send to the POSCS, data for transactions for IDs read by the ID reader at that POS.

The MCS Customer I/O is an element present in some embodiment and not in others, and is associated with transmitting marketing communication to customers at the POS and optionally optically receiving from customers at the POS opt in and compliance information for regulated products.

Preferably, the MCS Customer I/O includes at the POS an MCS printer for printing communications and coupons intended for the customer at the POS.

Preferably, the MCS Customer I/O includes at the POS an MCS input device, such as a button or keypad, for use by a consumer at the POS in response to audio or visual prompts.

Preferably, the MCS Customer I/O includes at the POS an audio and/or video output for presenting audio or video information to the customer at the POS.

Preferably the ID reader is a bar code scanner. However, it may be an RF ID reader or the like, so long as it can generate I data signal specifying product ID and couponID for products and coupons. Preferably, the ID reader can also read CIDs presented by customers.

Preferably, the POSCS Output is a POS printer designed to print a register receipt indicating description of items purchase and costs of those items, and a total charge for the transaction. However, it may optionally be a data communication device for transmitting that data in digital form to some device carried by the customer, such as a cell phone or personal digital assistant, using, any one of a cellular, WIFI, and Bluetooth network for that purpose.

Preferably, the YCS is embedded in a physical cable in the form of a "Y" shape. The YCS is preferably located at the junction point of the Y, or along the path from the junction point to the POSCS.

Optionally, the printers, or printers and other I/O devices of system 1 may be replaced by wireless outputs intended for transmission of signals intended to be received by a device carried by a consumer, such as a cell phone or personal digital assistant device capable of receiving and processing data defining marketing communication and electronic analogs of paper coupons, and optionally data defining register receipts. In systems embodying WIFI and/or BlueTooth or similar short distance wireless protocols and implementing hardware, the ID reader may be designed to receive a couponID transmitted from a device carried by the consumer, or the YCS may include a wireless receiver capable of directly receiving the couponID, thereby bypassing the ID reader insofar as a couponID transmitted from a device carried by the consumer is concerned.

Figure 2:
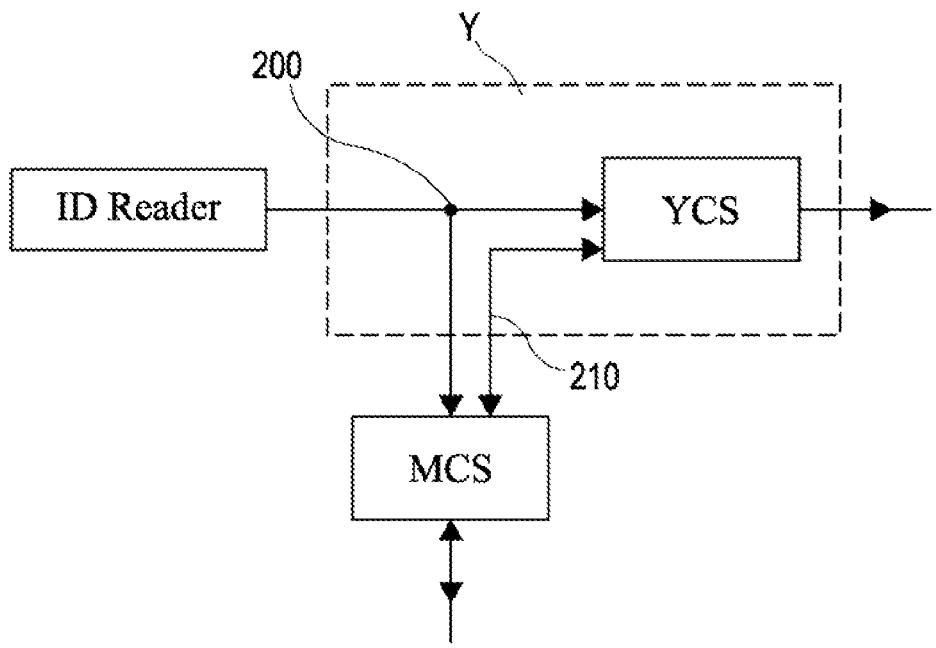
FIG. 2 shows alternative embodiment of the "Y" portion of network 1.

FIG. 2 shows an alternative embodiment of the Y portion of FIG. 1. In contrast with FIG. 1, junction point 200 transmits IDs read by the ID reader to both the YCS and MCS. In methods of operating using this embodiment, the YCS does not retransmit the ID received from the ID reader to the MCS. Moreover, data communication line 210 and corresponding structure on YCS to which it is connected, may be designed or configured to provide only for data receipt, or for both data receipt and transmission. In some algorithms of use, the YCS must transmit data to the MCS other than IDs, as noted herein below.

Figure 3:
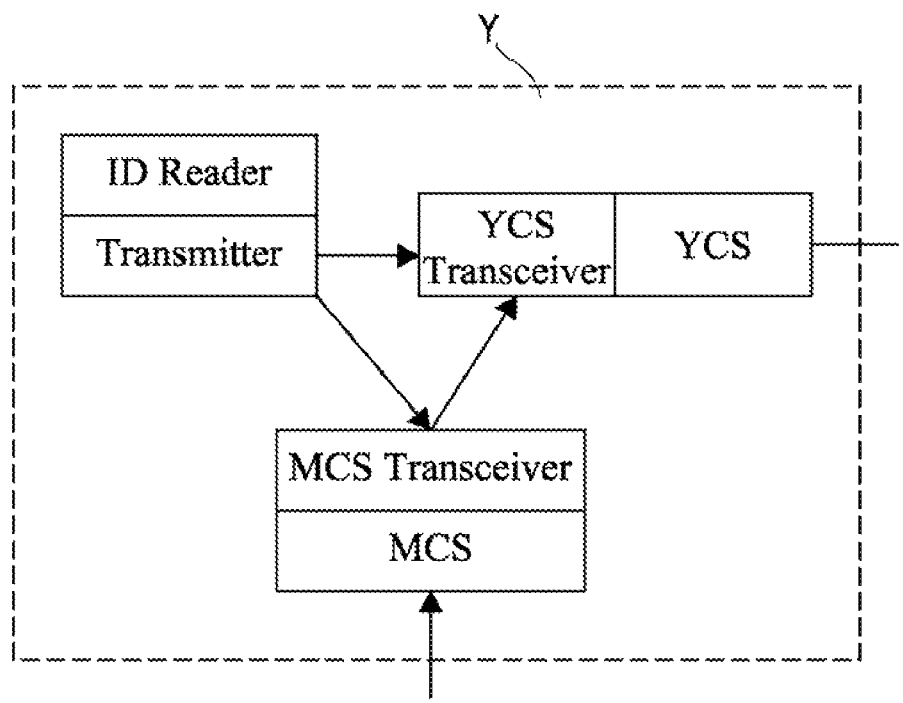
FIG. 3 shows another alternative embodiment of the "Y" portion of network 1.

FIG. 3 shows an alternative embodiment of the Y portion of FIG. 1. In contrast with FIG. 1, FIG. 3 shows the ID reader incorporating an ID wireless transmitter, the YCS incorporating a YCS wireless receiver or transceiver, and the MCS incorporating an MCS wireless transceiver. In methods using this embodiment, the ID reader wirelessly transmits IDs which are received by both the YCS and the MCS and the MCS wirelessly transmit IDs and other information to the YCS. In embodiments in which the YCS transmits information to the MCS, the YCS would incorporate a transceiver instead of a receiver.

Figure 4:
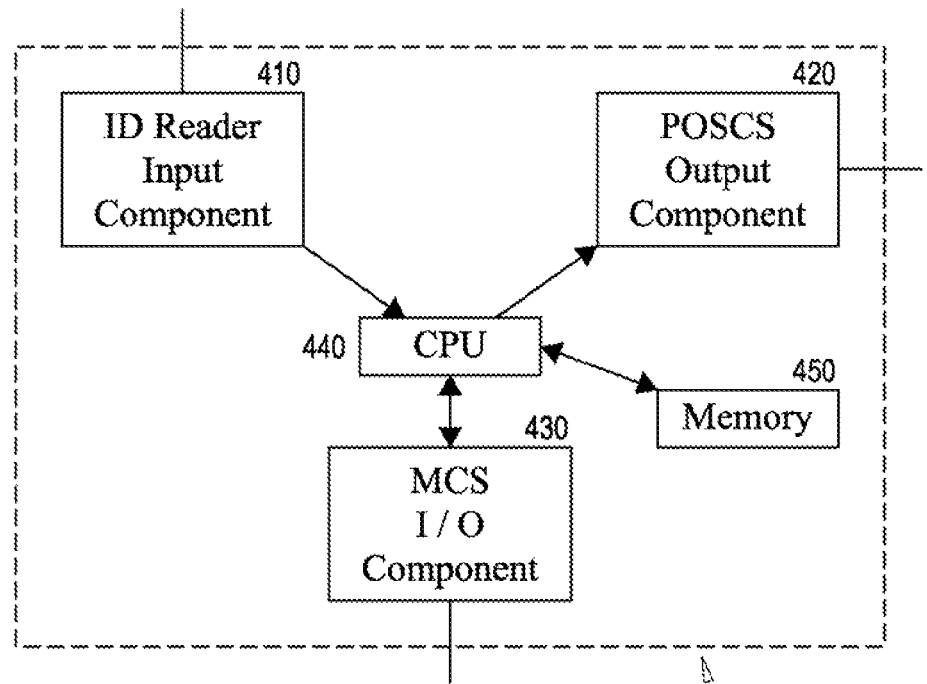
FIG. 4 is a schematic of YCS.

FIG. 4 schematically shows YCS 400 preferably including an ID reader input component 410, a POSCS Output component 420, a MCS I/O component 430, and including a CPU 440, and memory 450. The YCS is envisioned to be a relatively simple, and therefore more reliable, system, than the MCS. The YCS is designed so that in case the MCS fails transaction processing continues, only without the benefits of the processing functions provided by the MCS. Thus, YCS CPU 440 preferably executes firmware, not software residing in RAM loaded from disk, and stores limited data in memory. The I/O components 410, 420, 430, preferably serve the purposes of buffering, formatting, and temporally coordinating transmission and reception of data from the ID reader, POSCS, and MCS respectively.

Figure 5:
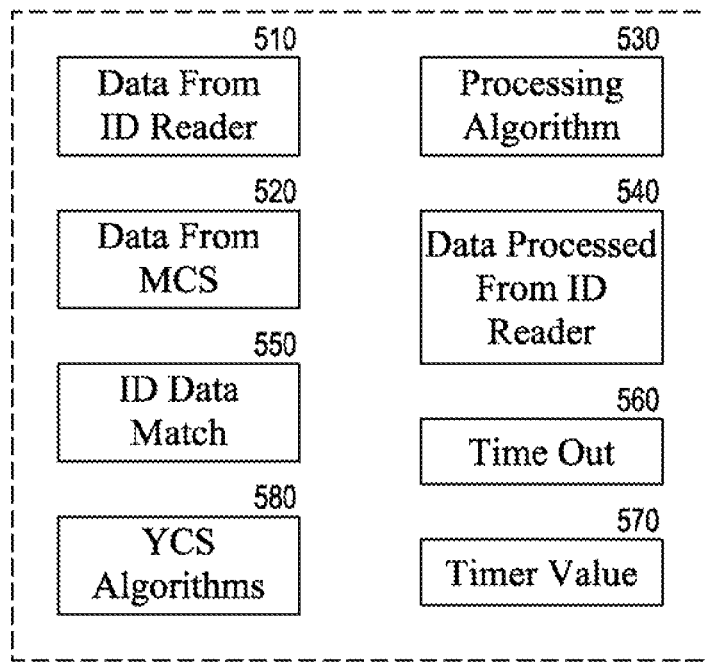
FIG. 5 is a schematic of data structures that may be stored in memory of the YCS.

FIG. 5 shows schematically data structures which may be stored in YCS memory 450 including: data 510 received from the ID reader; data 520 received from the MCS; algorithms 530 for processing data; data 540 processed by the YCS from data 510; data 550 for determining if data received from the CMS is ID data; data 560 specifying a time out; data 570 specifying a timer value, and data 580 storing coded algorithms for execution by the YCS.

Figure 6:
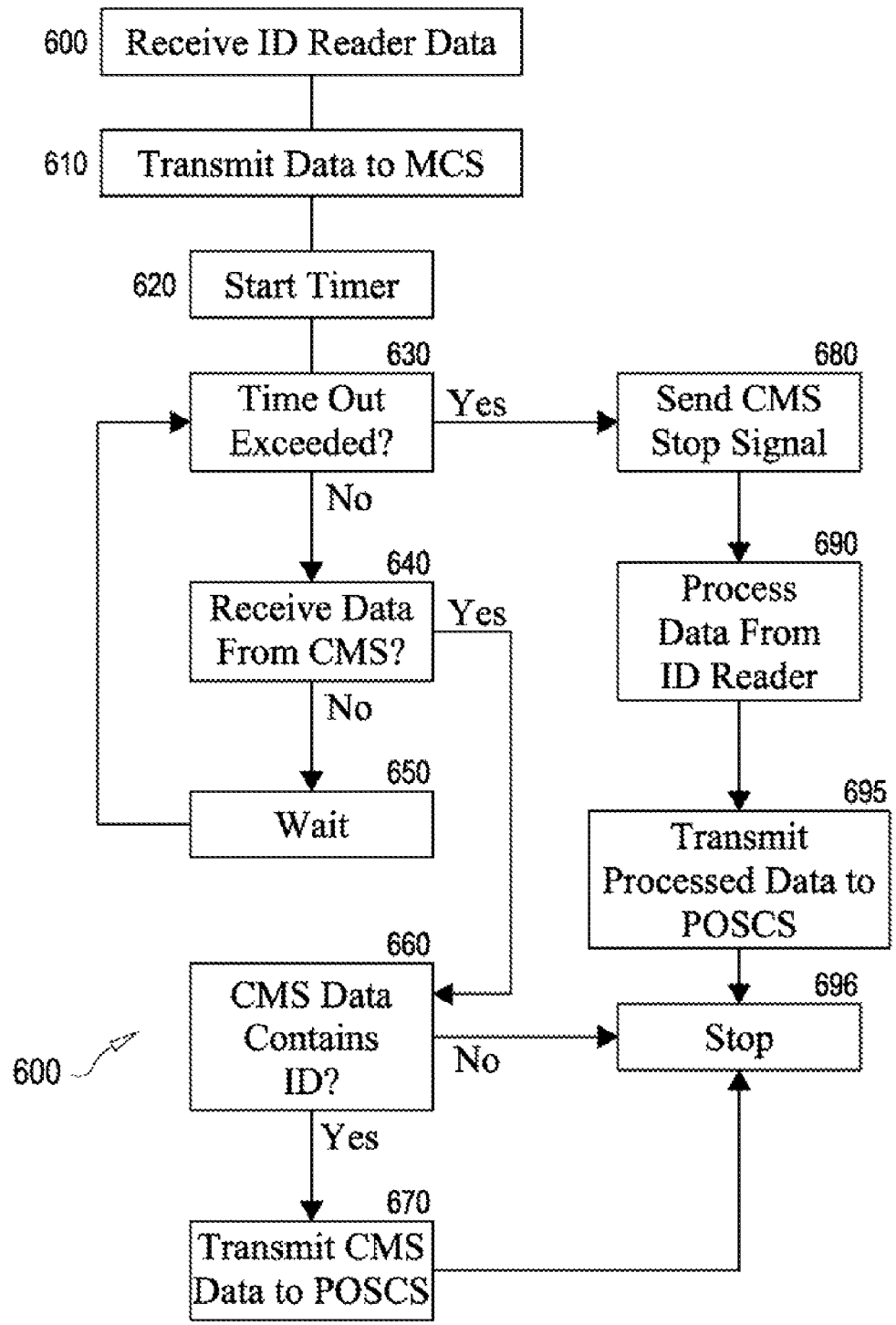
FIG. 6 is an algorithm that may be performed by the YCS upon receipt of an ID from the ID reader.

FIG. 6 is a flow chart 600 showing algorithms which may be performed by the YCS. The code for these algorithms may be stored in memory as data 580.

In step 600, the YCS receives ID reader data and stores that data in 510, then executes step 610. This data corresponds to an ID.

In step 610, the YCS transmits data from 510 to the MCS, that is the YCS transmits the ID received from the ID reader, then executes step 620.

In step 620, the YCS starts a timer 570, which indicates time from transmission of data 510 to the MCS, then executes step 630.

In step 630, the YCS determines if the timer value 570 exceeds time out 560. If yes, then executes step 680; if no, step 640.

In step 640, the YCS determines if it has received data 520 from the CMS. If yes, then executes step 660; if no, then executes step 650.

In step 660, the YCS determines if the data 520 received from the CMS contains an ID by comparing that data to ID match data 550. If yes, then executes step 670; if no, then executes step 696.

In step 670, the YCS transmits the data it received from the MCS to the POSCS, then executes stop 696.

In step 650, the YCS waits n clock cycles, then executes step 640.

In step 680, the YCS sends the CMS a stop signal, then executes step 690.

In step 690, the YCS processes data 510, then executes step 695. This step is optional, depending upon whether the ID data format transmitted by the ID reader is in the same specification as used by the POSCS. In some instances, they are not the same. For example, some POSCS employ a 10 digit UPC whereas the scanned data may be in a 13 bit UPC format. In one example, a POSCS does not use the first two or last digit of a 13 bit UPC specification, and therefore 13 bit ID data read by the ID reader must have the first two and last digit removed to make the format of the PID be in the specification stored in the POSCS. In such cases, step 690 or the like is required in order to convert data 510 to a format in which the ID represented thereby will be recognized by the POSCS. In installations in which the data format read by the ID reader is the same as the specification stored in the POSCS step 690 is skipped.

In step 695, the YCS transmits data 540 to the POSCS, then executes stop 696.

Data processing of an ID transmitted by ID reader should be much faster than the time between the ID reader reading IDs. For example, if the ID reader is a bar code scanner, it reads IDs no faster than a person can present them to the scanner, which is not less than a tenth of a second. Accordingly, processing of each ID by YCS should be complete within a tenth of a second. Accordingly, preferably the time out period, data 560, should be set to not more than a tenth of a second, preferably not more than 50 milliseconds to afford time for YCS to process data and complete step 695 within 100 milli seconds.

Alternatively, the YCS may be configured to handle situations where time between consecutive reading of IDs might be faster than time for processing each ID. This alternative may be necessary in situations where the process of reading IDs is not limited to time delays relating to manipulation of location of product items to face an optical scanner, such as situations where ID reader reads all RF IDs proximate the ID reader within milli seconds. This alternative may be necessary also in some situations in which bar code readers are used, but the time between at least some scans is very short. In this alternative, multiple data storage registers exist in YCS memory (either in RAM memory or memory associated with an I/O component, or both) for data from ID reader 510. Step 605, store ID reader data in 510, is inserted between steps 600 and 610, step 610 is modified to transmit to the MCS one of the IDs stored in 510 that has not yet been sent to the MCS, and step 696 is modified to a loop back to step 610 (to transmit the next stored ID the MCS).

In this alternative, the YCS may further be programmed to instantiate a process running algorithm 600 from step 610 to step 696, for each ID stored in 510, so that multiple processes are running concurrently.

In all embodiments of the YCS, after the YCS transmits an ID to the POSCS, the corresponding ID data in data structures 510, 520, and 540 is deleted from YCS memory.

Figure 7:
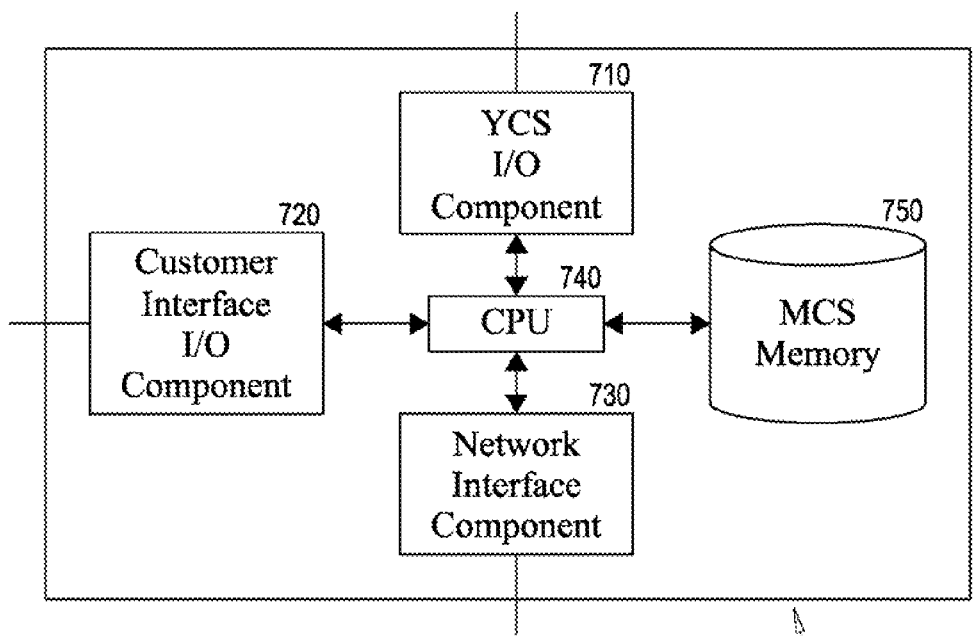
FIG. 7 is a schematic of the MCS.

FIG. 7 schematically shows elements of MCS 700 preferably including YCS I/O component 710, customer interface I/O component 720, network interface component 730, and including CPU 740, and MCS memory 750. The I/O components 710, 720, 730, preferably serve the purposes of buffering, formatting, and temporally coordinating with CPU 740, transmission and reception of data from the YCS, the customer interface, and the Network, respectively, of FIG. 1.

Figure 8:
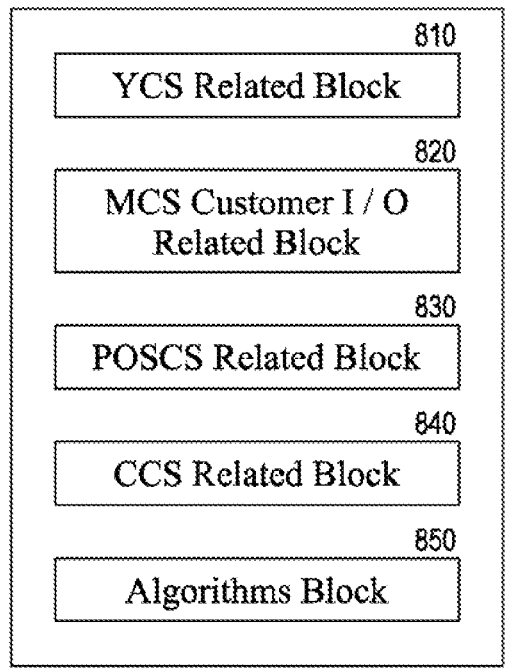
FIG. 8 is a schematic of data structures that may be stored in memory of the MCS.

FIG. 8 is a schematic of blocks of data structures that may be stored in memory of the MCS.

Each block in such a memory structure may be stored in a specified memory address range or in association with a linked location or locations in an object oriented model, either predetermined or by dynamic form of allocation by the MCS operating system. Each block stores data structures that facilitate interaction with a particular device with which the MCS communicates.

FIG. 8 shows MCS memory 750 storing YCS Related Block 810; MCS Customer I/O Related Block 820; POSCS Related Block 830; CCS Related Block 840; and Algorithms Block 850.

FIG. 9A shows data structures in YCS related block 810 storing data structures for processing data received from and sent to the YCS, including YCS ID data structure 910A; CouponID data table 915A; ID type table 920A; YCS timer data structure 930A; Coupon validation criteria table 940A; Coupon Value table 950A; PLUID table 960A; and YCS-MCS transaction table 970A.

Herein "table" has the meaning associated with a relational database table, of a set of records in which each record has at least two fields, each field designated for storing a particular type of data, and different fields in a record are associated with one another.

YCS ID data structure 910A stores an ID datum received from the YCS. In alternative embodiments in which the MCS algorithms are designed to concurrently process multiple IDs received from the YCS, YCS ID data structure 910A may be a sequence of memory structures each capable of storing a single YCS ID datum.

CouponID data structure 915A stores, during a transaction, couponIDs that were identified by the MCS from data in YCS ID data 910A, during that transaction.

ID type table 920A stores data necessary to determine which type or class of ID is present in the YCS ID datum stored in 910A. Preferably, table 920A stores one record for each of CID, PID, couponID, and timeout, and filter data appropriate for use in comparing with the value stored in 910A, to determine which type of ID is present in 910A. For example, if YCS ID data stores a 15 digit digital value, the values of the first two digits may define whether the ID defined in the remaining 13 digits is a PID, CID, couponID, or timeout signal, and the remaining 13 digits for PIDs may have values in a conventional specification of UPCs each of which identifies a unique product item. ID type 920A would then store 2 digit values for matching to the leading two digits in a YCS ID datum.

YCS timer 930A stores a value corresponding to clock cycles in the MCS. This value may be used by the MCS to determine if its processing of a particular ID is no longer within a time limit.

Coupon validation criteria 940A is exemplary only of the fact that couponID may be validated against specified criteria by the MCS. For purposes of table 940A and in the MCS, couponID validation means determination of whether conditions precedent to awarding the value associated with a couponID as a discount. Coupon validation criteria may include existence, in the same transaction (aka, same transaction defined for example by receipt by the MCS from the POSCS output line of an end of transaction signal), of a specified PID, a specified CID, a transaction total amount, lack of another entry of the same couponID, total value of transaction more or less than a specified value, total value or number of purchases of a certain product ID in the store, or total value of all purchase in the store in some specified time period, more or less than a certain value, current date being in a date range, etc. Hence, table 940A may include fields that are coupon validation criteria that store CID, PID. In addition, although not shown, table 940A may include links to other tables or data structures storing values for any one or more of the totals discussed in this paragraph.

Coupon value table 950A stores couponID in association with a value. The line connecting the file names "CouponID" in tables 940A and 950A represents a one to one link of the type connoted in a relational database between the two fields. Lines connecting other tables herein also have this meaning.

PLUID table 960A stores value in association with PLUID. As noted herein, PLUID is an ID which the MCS replaces for a couponID and transmits to the YCS in response to validation of a couponID received from the YCS.

YCS-MCS transaction table 970A represents a table storing the IDs identified by the MCS for a current transaction, including preferably in each record fields for a TID, a CID, plural PIDs, and any couponIDs and corresponding PLUIDs.

Figure 9B:
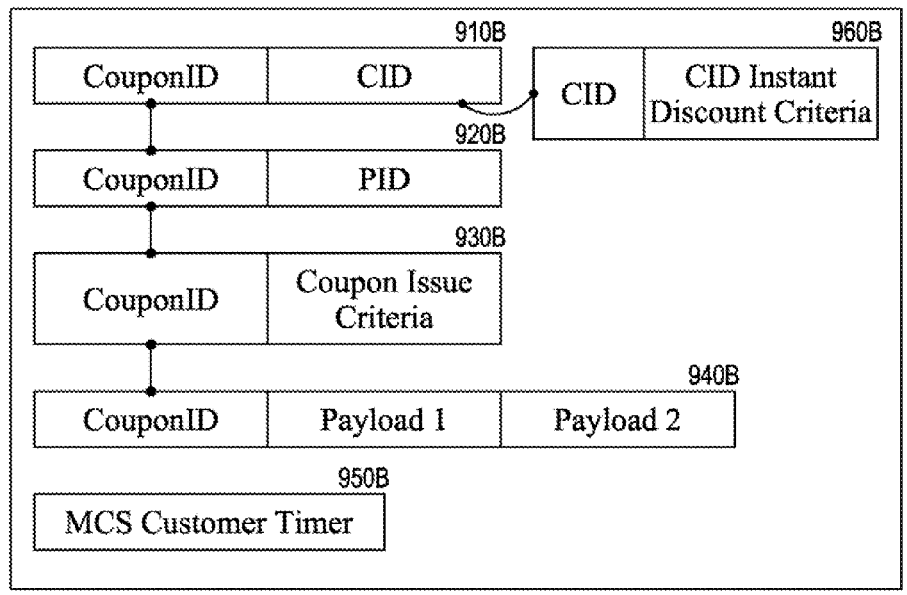
FIG. 9B shows data structures in MCS customer related I/O Block 820 of MCS memory 750.

FIG. 9B shows data structures in MCS customer related I/O Block 820 including CID table 910B; PID table 920B; Coupon Issue Criteria table 930B; Payload Table 940B; and MCS Customer Timer data structure 950B; and CID Instant Discount Criteria Table 960B.

The tables 910B, 920B, 930B, and 940B preferably have their CouponID fields linked defining a one to one relationship.

The tables 910B, 960B preferably have their CID fields linked.

Tables 910B; 920B; 930B; and 940B are preferably used in processing determining whether to issue a new coupon to a consumer at the POS.

Like Coupon validation criteria 940A, Coupon Issue criteria 930B is exemplary only of the fact that couponID may be issued if certain determinable criteria are satisfied. For purposes of the MCS, couponID issue criteria include conditions precedent to awarding a coupon associated with a couponID to a consumer engaged in a transaction at the POS. Coupon issuance criteria may include existence, in the same transaction (aka, same translation defined for example by receipt by the MCS from the POSCS output line of an end of transaction signal), of a specified PID, a specified CID, a transaction total amount, lack of another entry of the same couponID, total value of transaction more or less than a specified value, total value or number of purchases of a certain product ID in the store, or total value of all purchase in the store in some specified time period, more or less than a certain value, current date being in a date range, etc. Hence, table 930B may include fields that are coupon validation criteria that store CID, PID. In addition, although not shown, table 930B may include links to other tables or data structures storing values for any one or more of the totals discussed in this paragraph.

Payloads Payload1 and Payload2 in table 940B may contain data defining communication for the customer in response to validation of a couponID during a transaction. Payload1 may be, for example, data requesting consumer input, such as confirmation of consumer age above a specified value, such as 18 years, a confirmation that the consumer desires coupons printed, or a response to a prompt for input of a numeric value in a keypad, such as a consumer CID or PIN, or a response requesting presentation of a consumer ID card to a consumer ID card reader, or the like. Payload2 may be, for example, data defining a coupon for printing by a printer that forms part of the MCS customer I/O, or data defining the same coupon for wireless transmission to a device carried by the consumer and designed to receive coupon information wirelessly, or data defining transmission of the issued coupon data via a Network to a network address, such as a URL or email address, associated with a CID contained in the IDs for the current transaction.

MCS Customer timer 950B stores a value corresponding to MCS clock cycles for use to limit a wait time for customer input from the MCS Customer I/O in response to an MCS output to the output device for communicating with the customer.

Figure 9C:
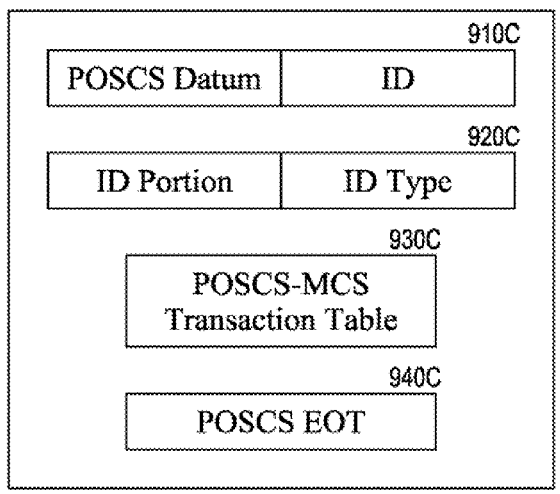
FIG. 9C shows data structures in POSCS Related Block 830 of MCS memory 750.

FIG. 9C shows data structures in POSCS Related Block 830 including a POSCS datum table 910C; ID Portion table 920C; and a POSCS-MCS transaction table 930C; and a POSCS EOT data structure 940C.

POSCS Datum table 910C contains one field for datum received from the POSCS output, and one field for ID. This table is useful for determining PIDs and other data contained in the data format used by the POSCS output. For example, if the POSCS output is designed as POS printer instructions to print a register receipt, the POSCS datum table would include in each record one entry specifying a value in specification for that POSCS output instructions and a corresponding value of a PID or some other value or control signal associated with the printer instructions specification used by the POSCS.

ID portion table 920C stores portions of IDs defining different types of IDs, such as PID, CID, end of transaction, and for example printer line return, transaction total, cut paper tape signal, etc.

POSCS-MCS Transaction table 930C stores in each record the transaction data from the POSCS output line as interpreted upon receipt by the MCS, for example using data in tables 910C, 920C, for that interpretation.

POSCS EOT data structure 940C preferably stores a value indicating that the MCS has received data from the POSCS output indicating that both a transaction ended and MCS processing for that transaction has not completed, and not storing that value when those two conditions are not satisfied.

Figure 9D:
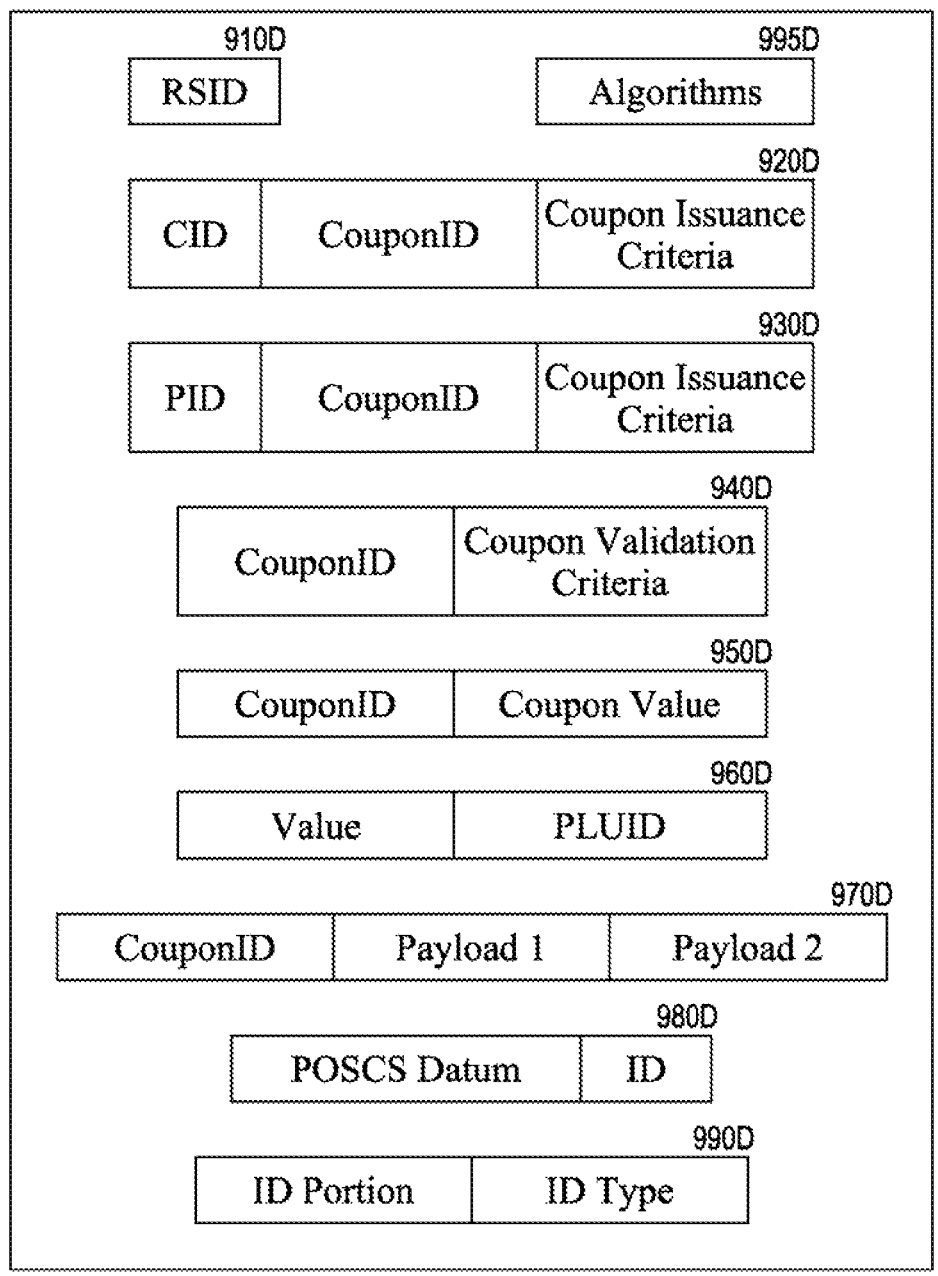
FIG. 9D shows data structures in CCS Related Block 840 of MCS memory 750.

FIG. 9D shows data structures in CCS Related Block 840 including RSID data structure 910D; CID coupon issuance criteria table 920D; PID coupon issuance criteria table 930D; coupon validation criteria table 940D; coupon value table 950D; PLUID table 960D; Payload table 970D; POSCS datum table 980D; and ID type table 990D; and algorithms data structure 995D.

RSID data structure 910D stores a RSID that preferably uniquely identifying RS1 in a data structure in the CCS, compared to other RSs that communicate with the CCS.

In an alternative in which there are plural POSs in the RS and a corresponding plural number of MCSs, preferably at least one designated MCS stores a RSID for the retail store. In this alternative, the MCSs that are not designated may forward log data to the designated MCS and the designated MCS may forward that log data to the CCS and forward updates received from by the designated MCS from the CCS to each of the non designated MCS in the RS. In this alternative, optionally, each MCS has a unique MCS ID and that MCS ID information is contained in the logs for that MCS's record of transactions at that MCS's POS and in a table in memory of the designated MCS. Here, log refers to transaction records stored by the MCS, either based upon the PID and other data received from the YCS or the POSCS, and defined by some end of transaction determination, such as end of transaction data received by the MCS in the data stream in the output of the POSCS.

Algorithms data structure 995D contains updates to code for Algorithms Block 850, for executing algorithms on the one or more MCSs and YCSs. It should be noted that in an alternative embodiment, MCS code may include updates for the code residing in firmware or RAM or the like in the YCS, in addition to code instructing the MCS how to perform such updates. In this alternative, the YCS is subject to control by the MCS via control data instead of ID data transmitted from the MCS to the YCS, enabling the MCS to perform such updates to the YCS code.

Preferably, tables 920D to 990D (CID coupon issuance criteria table 920D; PID coupon issuance criteria table 930D; coupon validation criteria table 940D; coupon value table 950D; PLUID table 960D; Payload table 970D; POSCS datum table 980D; and ID type table 990D) contain data received from the CCS in the same or similar format of the corresponding tables for processing data as discussed for the FIG. 8 blocks 810, 820, 830, and 850, and the MCS uses algorithms to update the corresponding tables data in blocks 810, 820, 830, and 850.

Figures 9E, 10:
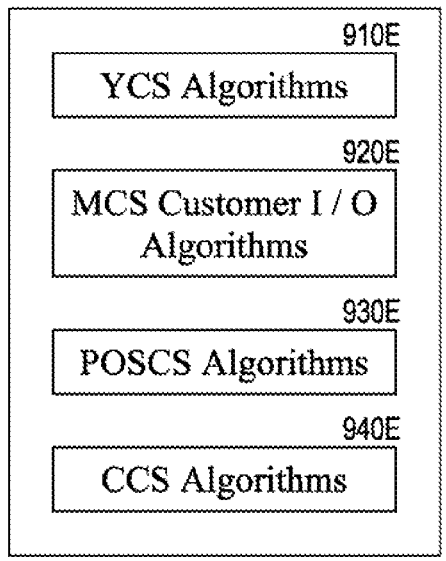
FIG. 9E shows data structures in Algorithms Block 850 of MCS memory 750.
FIG. 10 shows exemplary table data structures for log data 1000 stored by the MCS in MCS memory 750.

FIG. 9E shows data structures in Algorithms Block 850 including sub blocks 910E, 920E, 930E, and 940E storing algorithms for processing data received from or sent to the YCS, the MCS Customer I/O, the POSCS, and the CCS, respectively. In addition, YCS Algorithms 910E may include code for algorithms run by the MCS to update algorithms or data stored by the YCS.

FIG. 10 shows exemplary data structures for log data 1000 stored by the MCS in MCS memory 750 including YCS-MCS transaction table 1010 and POSCS-MCS transaction table 1020, and one to one link 1030 between TID fields of tables 1010, 1020.

YCS-MCS transaction table 1010 stores data for information obtained by the MCS, from the YCS, and corresponding data generated by or retrieved from memory by the MCS, between receipt of signals indicating to the MCS end of transaction. This data preferably includes a TID generated by the MCS for the transaction and therefore table 1010 preferably includes a field for TID. This data may include one (or more) CIDs and therefore table 1010 includes a (or in alternatives more than one) field labeled CID for IDs that the MCS determines are CIDs. Table 1010 also may include one of more fields for storing PIDs, one more field for storing couponIDs, and one or more fields for storing PLUIDs for storing a PLUID corresponding to each stored couponID. However, table 1010 is shown having one or more fields for storing PIDs labeled as "PID1, . . . PIDn" where 1, . . . n represent n PIDs. In addition, table 1010 is shown having one or more fields representing couponIDs and PLUIDs "CouponID1, PLUID1, . . . . CouponIDj, PLUIDj" where 1, . . . j represent J couponIDs and the corresponding j PLUIDs. Alternative forms of representing a transaction record exist, and the exact data structure form noted for records in table 1010 is not essential. As shown in FIG. 10, all PIDs are stored in a single field in which different PIDs are separated by comma, and all couponIDs and corresponding PLUIDs are stored in a single field, again, separated by commas. One alternative would be store each such datum in a separate field, and have the total number of fields in each record vary according to the number of PIDs and couponIDs in the corresponding transaction.

POSCS-MCS transaction table 1020 preferably includes a field for TID, labeled TID', for storing a transaction ID identified from the data flow from the output of the POSCS. It may be that the POSCS outputs no data corresponding to a TID in which case this field need not exist, may not contain data, or may be populated by the MCS with the TID generated by the MCS. Similarly, table 1020 may or may not include a field corresponding to the field for CID data in table 1010. In some embodiments, the POSCS does not receive CID data and in these embodiments inclusion in table 1020 of a field corresponding to the CID field in table 1010 is not necessary. This field, if present, is represented in FIG. 10 table 1020 by the text "(null)" appearing directly below the field labeled "CID" in table 1010. Table 1020 preferably also includes one or more fields that store PIDs that the CMS identifies in the data flow of the output of the POSCS. PIDs that the CMS identifies in the data flow of the output of the POSCS are represented in table 1020 by "PID1, . . . PIDn" where 1, . . . n represent the n PIDs contained in a transaction. Table 1020 also includes one or more fields for storing PLUIDs that the CMS identifies in the data flow of the output of the POSCS. PLUIDs that the CMS identifies in the data flow of the output of the POSCS are represented in table 1020 by "PLUID1, . . . PLUIDj" where the 1, . . . j represent J PLUIDs. FIG. 10 shows all PIDs are stored in table 1020 in a single field, comma separated, and all corresponding PLUIDs stored in a single field, again, comma separated. One alternative would be store each such datum in a separate field, and have the total number of fields in each record vary according to the number of PIDs and couponIDs in the corresponding transaction. Another alternative would be to store all IDs in table 1020 in the order in which they appear temporally in the data flow of the output of the POSCS. Another would be to store all data from that POSCS output for a transaction.

Figure 11:
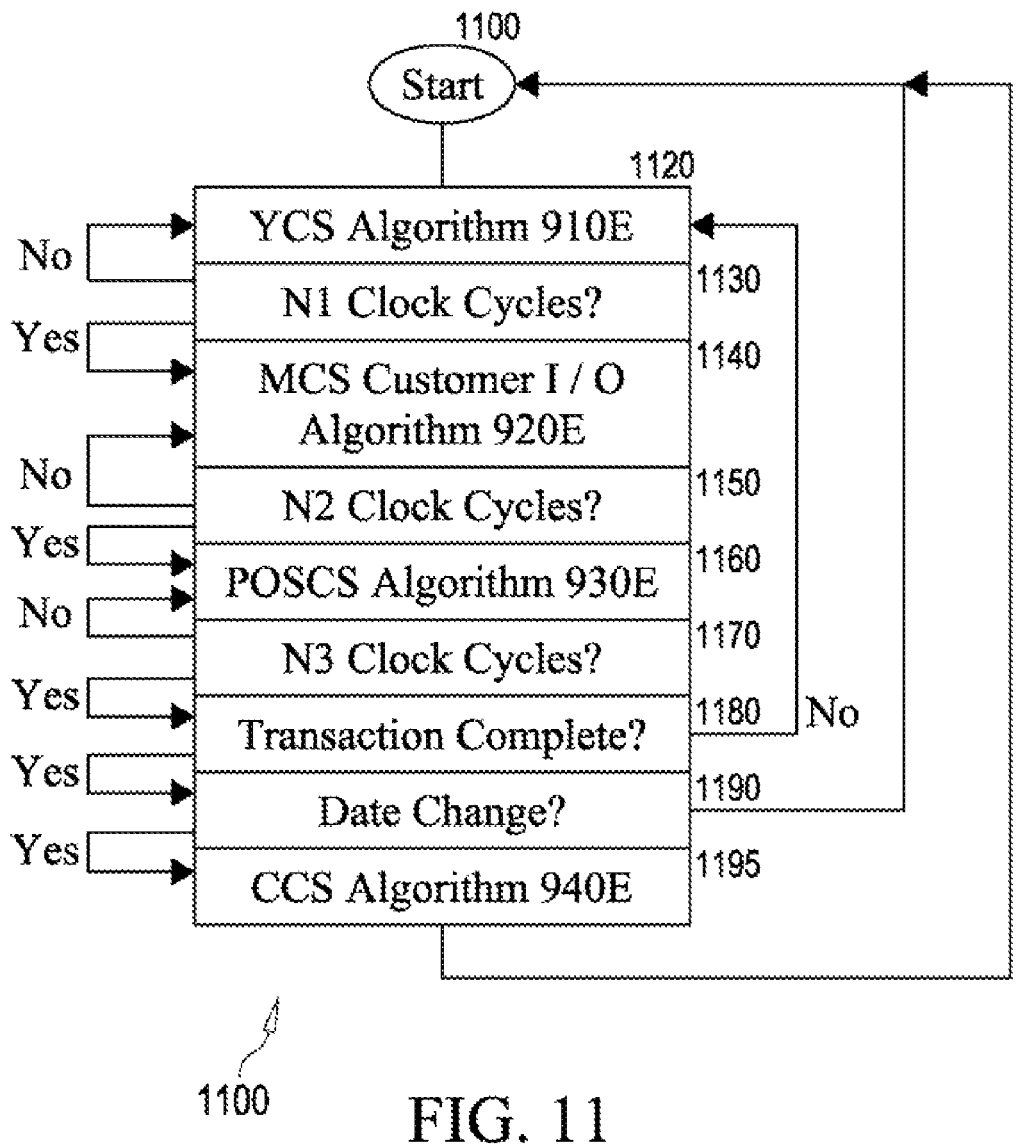
FIG. 11 is a flow chart showing an overview of one sequence of processing algorithms performed by an MCS.

FIG. 11 shows an embodiment of an overview of processing performed by an MCS indicating pseudo concurrent processing of algorithms in MCS processing interactions with the YCS, the MCS Customer I/O, and the POSCS output, and periodically (for example, daily, at midnight) performing algorithms relating to interactions with the CCS. Alternatively, algorithms 910E, 920E, and 930E may be performed completely sequentially. FIG. 11 shows algorithm 1100 including start 1110, and steps 1120-1170 representing processing of algorithms 910E, 920E, and 930E, each for a specified number of clock cycles of the CPU of the CMS, to show that processing of algorithms 910E, 920E, and 930E may be swapped so that algorithms 910E, 920E, and 930E may complete processing promptly in response to received data, during a transaction. N1 specifies the number of clock cycles to be used by the CPU of the CMS to process YCS Algorithm 910E, before proceeding to process MCS Customer I/O algorithm 920E. N2 specifies the number of clock cycles to be used by the CPU of the CMS to process MCS Customer I/O algorithm 920E, before proceeding to process POSCS Algorithm 930E. N3 specifies the number of clock cycles to be used by the CPU of the CMS to process POSCS Algorithm 930E, before determining if the transaction is complete.

In start 1110, the MCS clears data from temporary data registers from the prior transaction and awaits data from the YCS.

In step 1120, the MCS begins or continues executing a YCS Algorithm 910E for processing data it receives from the YCS. Process of the YCS Algorithm 910E continues if processing flow is from step 1180 to step 1120. Processing of the YCS Algorithm 910E begins if process flow is from step 1100 to step 1120.

In step 1130, the MCS determines if it has processed YCS Algorithm 910E for N1 clock cycles. Not shown here or for N2 or N3 and implicit are the steps of setting N1, N2, and N3 to values and incrementing the values stored for N1, N2, and N3, based upon clock cycles. If yes, processing proceeds to step 1140. If no, processing of YCS Algorithm 910E continues.

In step 1140, the MCS begins or continues executing a MCS Customer I/O Algorithm 920E.

In step 1150, the MCS determines if the CPU of the MCS has been processing the MCS Customer I/O Algorithm 920E for N2 clock cycles. If yes, processing proceeds to step 1160. If no, processing of the MCS Customer I/O Algorithm 920E continues.

In step 1160, the MCS begins or continues processing of POSCS Algorithm 930E.

In step 1170, the MCS determines if the CPU of the MCS has been processing the POSCS Algorithm 930E for N3 clock cycles. If yes, processing proceeds to step 1180. If no, processing of the POSCS Algorithm 930E continues.

In step 1180, the MCS determines if the transaction is completed. For example, the MCS may inspect the value stored in the data structure POSCS EOT 940C. If the value of POSCS EOT 940C matches a value (stored elsewhere) indicating transaction completed, processing continues to step 1190, and if not returns to step 1120.

In step 1190, the MCS determines if the date has changed (for example by comparing current date from date/time service to stored date from time of last run of the CCS algorithm). If no, processing continues to step 1100, and if yes, processing proceeds to step 1195.

In step 1195, the MCS executes a POSCS Algorithm 940E, and then returns to step 1110.

Figure 12A:
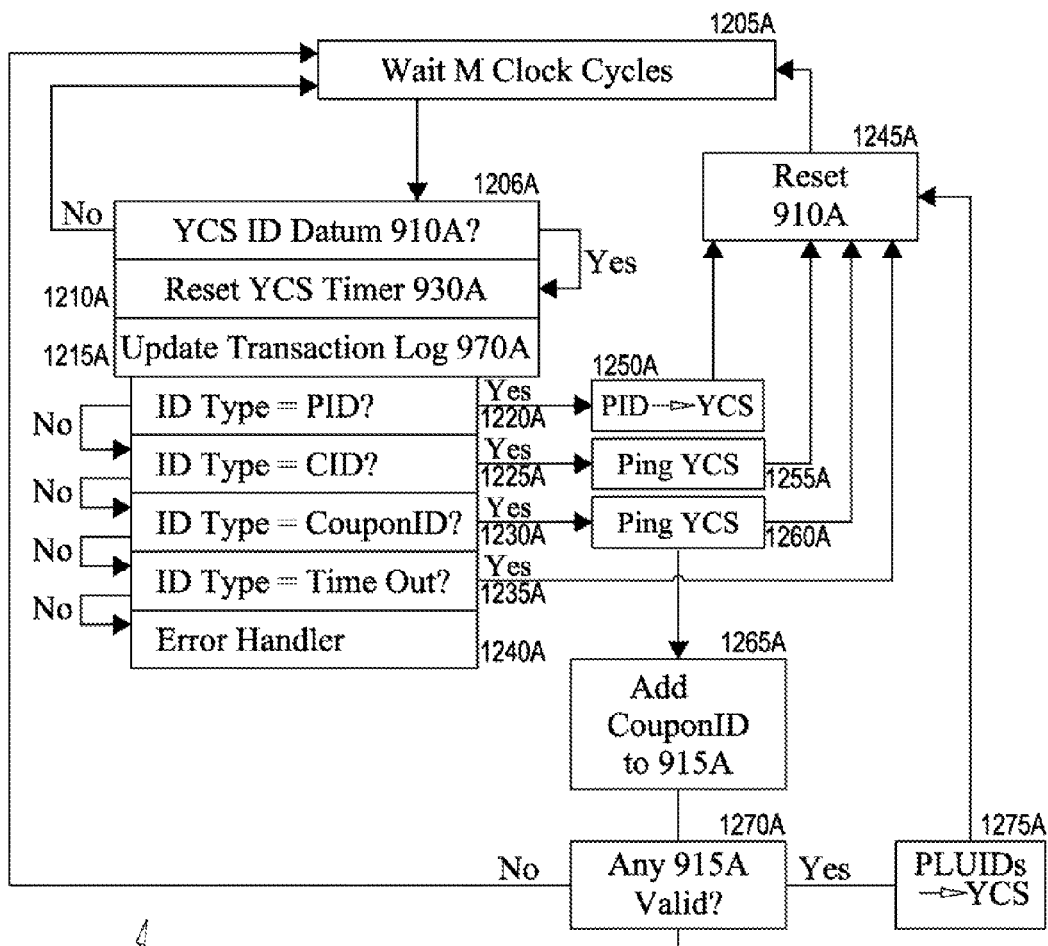
FIG. 12A is a flow chart for an embodiment of a YCS Algorithm 910E executed by the MCS.

FIG. 12A is a flow chart for a YCS Algorithm 910E shown as step 1120 in FIG. 11.

In step 1205A, the MCS waits M clock cycles of the MCS CPU, then executes step 1206A.

In step 1206A, the MCS determines if data structure 910A stores a YCS ID datum. If no, process flows back to wait state 1205A. If yes, process flows to 1210A.

In 1210A, the MCS resets the value of YCS timer 930A, and proceeds to step 1215A.

In step 1215A, the MCS updates its transaction log 970A, and proceeds to step 1220A. It should be noted that the step may occur at some other point in processing, for example after determination of ID type in steps ending at 1230A.

In step 1220A, the MCS determines if ID type is PID, by comparison of the YCS ID datum stored in 910A with ID portion data stored in 920A. If yes, the MCS proceeds to step 1250A and if no it proceeds to step 1225A.

In step 1225A, the MCS determines if ID type is CID, by comparison of the YCS ID datum stored in 910A with ID portion data stored in 920A. If yes, the MCS proceeds to step 1255A, and if no it proceeds to step 1230A.

In step 1230A, the MCS determines if ID type is couponID. If yes, the MCS proceeds to step 1260A, and if no it proceeds to step 1235A.

In step 1235A, the MCS determines if type is a time out signal (indicating that the YCS has determined that the time for the MCS to respond to the ID datum transmitted from the YCS has expired). If yes, the MCS proceeds to step 1245A, and if no it proceeds to step 1240A.

In step 1240A, the MCS executes an error handling routine (not shown) to deal with failure to identify the type of data stored in 910A.

In step 1250A, the MCS transmits, or pre processes and transmits, the identified PID to the YCS. Pre processing may be for the purpose of reformatting the PID into a specification used by the POSCS to identify UPCs. Such a reformatting was previously discussed in connection to the YCS operation when MCS failed to timely respond to the YCS requiring the YCS to pre process and transmit data the YCS received from the ID reader, to the POSCS. From step 1250A, processing proceeds to step 1245A.

In step 1245A, the MCS resets the value in 910A to a default value indicating no ID data present. From 1245A, processing proceeds to 1205A.

In step 1255A (when the ID is determined to be a CID), the MCS transmits a predetermined datum to the YCS, referred to here in as a "ping". This ping is predetermined to specify to the YCS that the ID value it most recently transmitted to the MCS should be discarded and not transmitted to the POSCS, and also to notify the YCS that the MCS is ready to receive another ID datum. From step 1255A, processing proceeds to 1245A.

In step 1260A (when the ID is determined to be a couponID), the MCS transmits a ping to the YCS, and then proceeds to step 1265A.

In step 1265A, the MCS adds the determined couponID to couponIDs stored in 915A (memory storing couponIDs determined to be present in the transaction in progress), and proceeds to step 1270A.

In step 1270A, the MCS coupon validation algorithms to determine if all of the coupon validation criteria associated with any couponID are satisfied. If so, processing proceeds to step 1275A, and if not, processing proceeds to step 1205A.

In step 1275A, the MCS looks up the PLUIDs corresponding to validated couponIDs, and transmits those PLUIDs to the YCS. It should be noted that step 1275A is a simplification for purposes of illustration. For example, additional consideration may arise as to the timing of such transmissions to the YCS depending upon the communication protocols. However, those types of issues are well known in the art.

The specific validation processing is also not specified. However, implementing coupon validation based upon certain criteria (as noted above for example the existence, in the same transaction (aka, same translation defined for example by receipt by the MCS from the POSCS output line of an end of transaction signal), of a specified PID, a specified CID, a transaction total amount, lack of another entry of the same couponID, total value of transaction being more or less than a specified value, total value or number of purchases of a certain product ID in the store, or total value of all purchase in the store in some specified time period, more or less than a certain value, current date being in a date range) is a matter of routine skill in the programming arts.

Although not shown, the process of determining an instant discount is similar, to that shown in FIG. 12A for determining validity of a couponID. The only substantive difference is that each CID is checked for instant discount criteria in table 960B, and if the CID is present in that table, the MCS determines if the associated instant discount criteria, if any, are met, and response to a validated CID by transmitting a PLUID associated with the validated instant discount criteria, to the YCS.

Figure 12B:
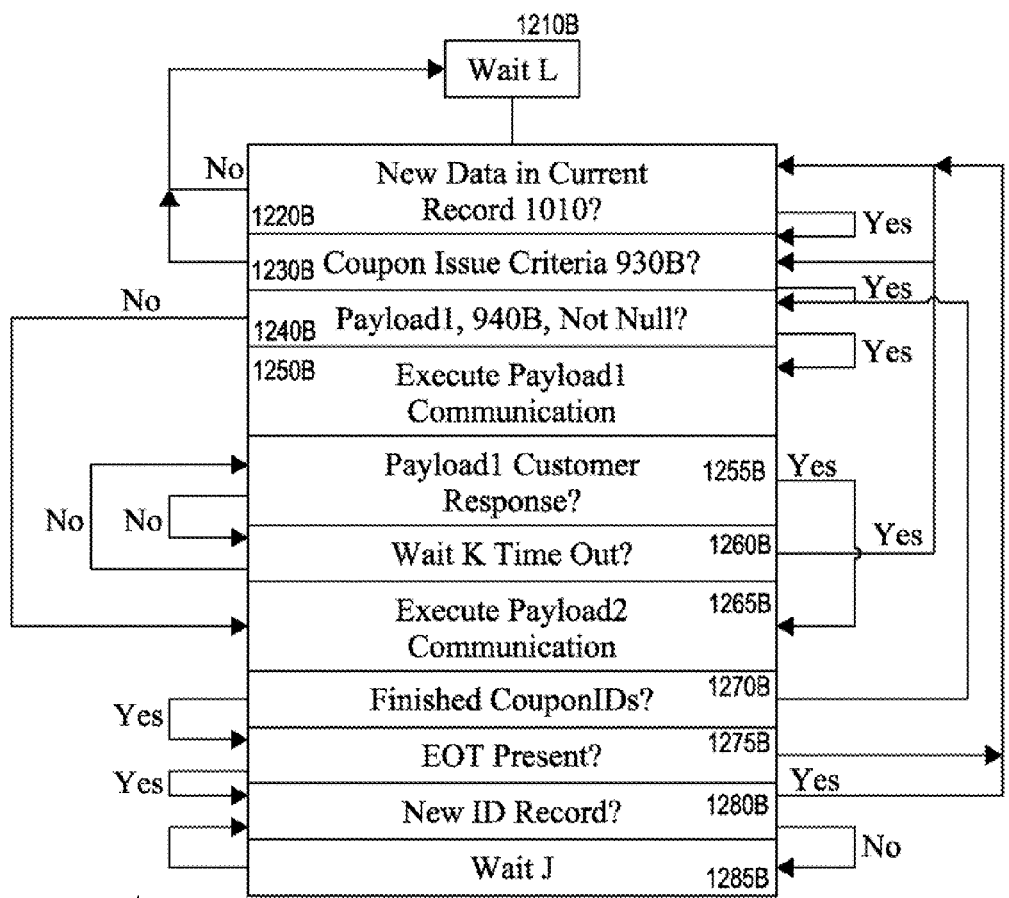
FIG. 12B is a flow chart for an embodiment of a MCS Customer I/O Algorithm 920E executed by the MCS.

FIG. 12B is a flow chart for an embodiment of a MCS Customer I/O Algorithm 920E executed by the MCS. FIG. 12B shows a sequence of steps in which the MCS checks for the existence of a new transaction record in a transaction log, and then repetitively checks for new data in that record to determine if coupon issue criteria are met by updated data in that record until the that corresponding transaction is completed as indicated by an EOT data in the transaction record.

In step 1210B, the MCS waits L clock cycles, and then executes step 1220B.

In step 1220B, the MCS checks for the existence of a new data in the current record for the present transaction in the YCS-MCS transaction table 1010. If it finds no new data, it executes 1210B. If it finds new data, it executes 1230B.

In 1230B, the MCS executes code determining whether the data in the current transaction record in table 1010 satisfies coupon issue criteria for one or more couponIDs. If no for all such couponIDs, execute wait 1210B. If yes for a particular couponID, execute step 1240B.

In 1240B, determine if there is no data (a null value) in the field Payload1, table 940B, for the corresponding couponID. If the answer is no (that is, if there is a null value in field Payload1 for that couponID in table 940B), go to 1265B. If the answer is yes, that is, there is a non null value for Payload1, go to 1250B.

In 1250B, the MCS executes a communication defined by Payload1. For example, Payload1 may be data defining instructions for transmitting audio signal to an audio speaker forming part of the MCS customer I/O elements of FIG. 1. For example, the audio message may instruct the customer to confirm their age greater than 17 by pressing a button. The button is also part of the MCS customer I/O, and the pressing of the button transmits a signal back to the MCS. The MCS then executes step 1255B.

The MCS customer I/O elements are generally any elements which can transmit information to and receive information from the customer at the POS or a device such as cell phone or portable electronic device at the POS controlled by the customer. These may include for example audio receivers, data card readers, wireless transmitters and receivers. Another option for the communication to the customer may be asking the customer whether they want coupons printed for them.

In 1255B, the MCS determines whether it has received a Payload1 customer response, such as the signal from the button in the foregoing example. If yes, the MCS executes step 1265B, and if no, the MCS executes step 1260B. The customer response may alternatively be voice, read CID or PIN, or read credit card number.

In step 1260B, the MCS waits K clock cycles and determines is a predetermined time out period since step 1250B (communication to the customer) has elapsed. If no, the MCS returns to step 1255B. If yes, the MCS returns to 1220B.

In step 1265B, the MCS executes a communication defined by Payload2. For example, Payload2 may be transmission of data defining one or more coupons for printing by a printer forming part of the MCS customer I/O of FIG. 1, or transmission of corresponding data defining the coupon terms and conditions and couponID to a wireless portable device carried by the customer and having a network ID known to the MCS in association with the transaction. The association may be in a data structure containing an CID received in the transaction data for the current transaction and an association of the CID with a cellular telephone number or email address. The MCS then executes step 1270B.

In step 1270B, the MCS determines if all couponIDs meeting coupon issue criteria have been processed. If yes, the MCS executes step 1275B. If not, the MCS continues at step 1240B with the next couponID identified in step 1230B.

In step 1275B, the MCS determines whether an end of transaction, EOT, datum is present in the current record. That is, whether the current transaction has terminated, for example by inspecting POSCS EOT 940C. If no, the MCS returns to step 1220B. If yes, the MCS executes step 1280B.

In step 1280B, the MCS checks to determine if a new record has been added to the YCS-MCS transaction table 1010. If yes, it proceeds to 1220B for processing of data in that new record for the corresponding new transaction. If no, it executes step 1285B.

In step 1285B, the MCS waits J clock cycles, and then returns to step 1280B.

One alternative to algorithm 1140 in FIG. 12 B is to cache the payload determinations until determination in step 1275B of an end of transaction, and only then transmit information specified by Payload1 and Payload2 to the MCS Customer I/O and process responsive information from the customer indicating whether to transmit certain Payload2 information. Other alternative algorithms exist and would be apparent to one skilled in the arts. The purpose of FIG. 12B is merely to expressly provide one algorithm for such processing.

Figure 12C:
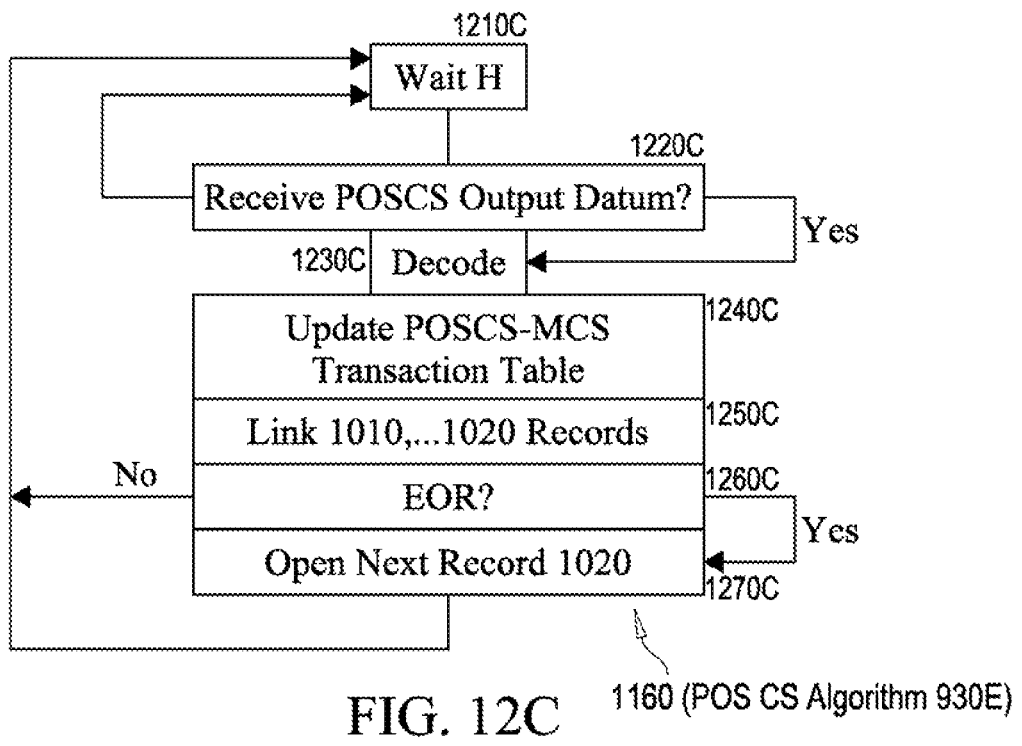
FIG. 12C is a flow chart for an embodiments of a POSCS Algorithm 930E executed by the MCS.

FIG. 12C is a flow chart for an embodiment of a POSCS Algorithm 930E executed by the MCS. This algorithm is an example of how the MCS can identify and store data it receives from the POSCS output into transaction records.

In 1210C, the MCS waits H clock cycles, then proceeds to 1220C.

In 1220C, the MCS determines whether it has received POSCS output data from the output of the POSCS as shown in FIG. 1.

In 1230C, the MCS decodes received data. For example, the MCS may compare a received datum to values of POSCS datum in table 910C to determine ID, such as PID or PLUID, or price data, or transaction total, or TID, or printer line return code or other printer control codes, etc. Then the MCS would use data in table 920C to determine ID type such as PID, price data, etc.

In step 1240C, the MCS updates the POSCS-MCS transaction table 1020, for example with data in the format shown in FIG. 10. Alternatively, other data may be included in other fields in table 1020, such as price data, printer control data, etc. Then the MCS executes step 1250C.

In 1250C, the MCS links the active records, the most recently created records, of the tables 1010 and 1020, for example by assigning the same value for TID in the current record in the YCS-MCS transaction table to the field for TID' in the POSCS-MCS transaction table. If the MCS determines that such a link already exists, it may skip this step. Then the MCS executes step 1260C.

In 1260C, the MCS checks for the presence of End Of Receipt of transaction data, EOR. The MCS may examine data received from the POSCS for a datum having an EOT datum type. Alternatively, the MCS may wait a specified number of clock cycles since last receiving datum from the POSCS output and assume if no additional datum appears on the output, that the transaction has ended. In any case, if the MCS determination is that there is end of receipt of data for a transaction, it proceeds to execute step 1270. If not, it proceeds back to step 1210C to await more data for the same transaction.

In one alternative, data flow on the POSCS output is relatively fast, and buffered by the MCS POSCS I/O component of the MCS. In this alternative, all data for a transaction will appear in a very short period of time on the POSCS output, and the input stream for processing by the POSCS Algorithm 930E will likely be a stack of data stored in memory of the MCS. In this case, step 1210C, the wait before checking for new datum, would not be present, and the check for and EOR would be replaced by check for end of the data stack in the memory of the MCS.

Figure 12D:
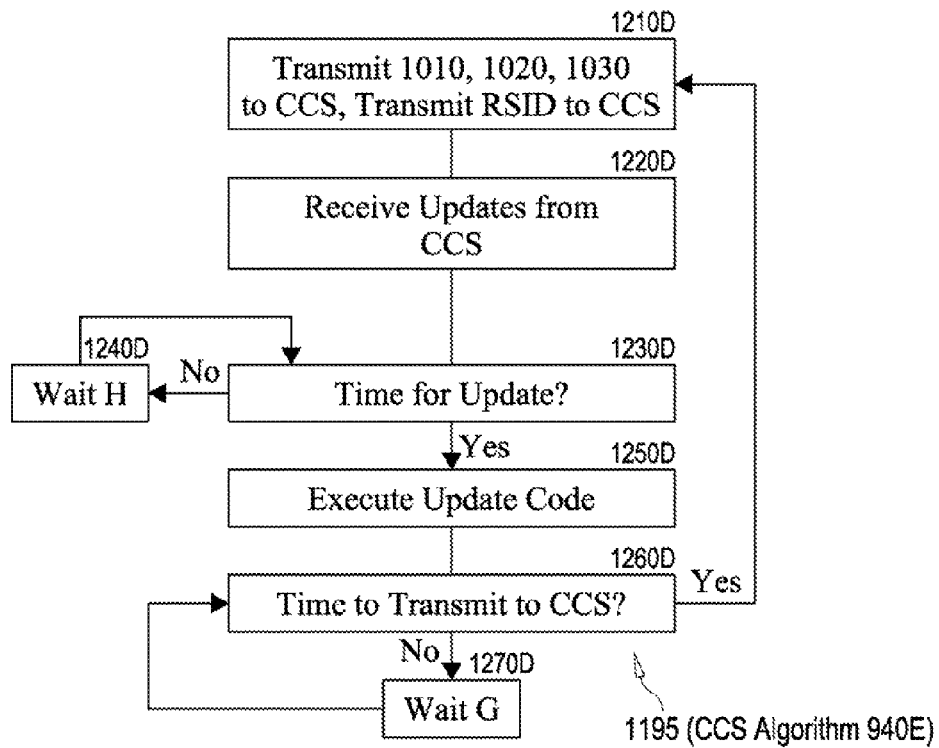
FIG. 12D is a flow chart for an embodiment of a CCS Algorithm 940E.

FIG. 12D is a flow chart for an embodiment of a CCS Algorithm 940E showing updating of the MCS.

In step 1210D, the MCS transmits its log data in association with its RSID to the CCS, via the Network of FIG. 1, and proceeds to step 1220D.

In step 1220D, the MCS receives from the Network Updates from the CCS and proceeds to step 1230D.

In step 1230D, the MCS determine whether it is time to perform update. If yes, it proceeds to step 1250D. If no, it proceeds to step 1240D.

In step 1240D, the MCS waits H clock cycles and returns to step 1230D.

In step 1250D, the MCS executes update code to implement updates of its data records, such as records in any of the data structures including tables, and code for execution noted in any of the blocks, in the foregoing figures and disclosure. Then the MCS executes step 1260D.

In 1260D, the MCS determines whether it is time to transmit log data to the CCS. If yes, it returns to step 1210D. If no, it executes step 1270D.

In step 1270D, the MCS waits G clock cycles, and then returns to step 1260D.

Figure 13:
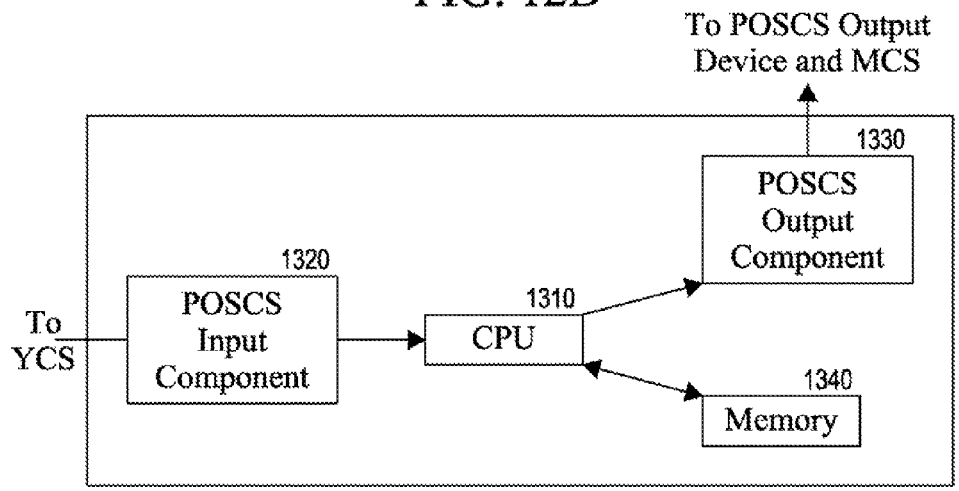
FIG. 13 is a schematic of a POSCS.

FIG. 13 is a schematic of a POSCS including POSCS CPU 1310, POSCS input component 1320, POSCS output component 1330, and POSCS memory 1340.

Figures 14, 15:
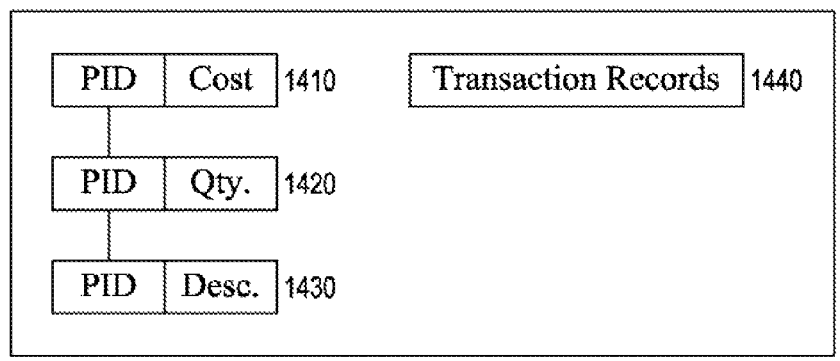
FIG. 14 is a schematic of data structures that may be stored in memory of the POSCS.
FIG. 15 is a partial view of data tables 1410 and 1420 of FIG. 13, in table view, showing the presence of PLUID records.

FIG. 14 is a schematic of data structures that may be stored in memory of the POSCS including PID cost table 1410, PID quantity table 1420, a PID description table 1430, and transaction records table 1440.

PID cost table 1410 stores PIDs in association with the store charge for purchase of a product item having that PID cost table 1410 is a PLU.

PID quantity table 1420 stores stock quantity in the retail store of product items having a corresponding PID.

PID description table associates each PID with a corresponding textual description of a product.

Transaction records table 1440 stores records for purchase transactions.

It should be noted that FIG. 14 represents the data structure of a conventional POSCS. This representation may be simplified compared to many POSCS, for example at least because the PID cost table may also include additional fields and other tables and data structures may be present.

Preferably, there is only one PLUID associated with any particular cost. Thus, PID cost table 1410, PID quantity table 1420, a PID description table 1430 store one record for each such PLUID. For example, there may be only 4 PLUIDs, each one associated with one of 25 cents, 50 cents, 75 cents, and 100 cents. If so, the processed disclosed herein would be capable of crediting a coupon discount having only one of these 4 cost values. Preferably, both the POSCS and MCS store the same PLUIDs. Preferably, the MCS is configured to transmit to the YCS only those PLUIDs stored in the POSCS memory.

FIG. 15 is a partial view of data tables 1410, 1420, and 1430 of FIG. 13 showing PLUID records in addition to PID records in tables 1410 and 1420. That is, while the data structures of the POSCS are the same as in a conventional POSCS, the data fields for PID price and stock quantity are populated with additional records for PLUIDs. It is these PLUID records that the POSCS may use to credit coupons validated by the MCS for which the MCS sent a PLUID to the YCS for transmission to the MCS. Table 1410 shows PLUIDs in association with costs. These costs may have an opposite sign from the cost for other items, since they are intended to represent discounts on the purchase transaction total cost, not additions as with actual product items being purchased. Table 1420 shows stock quantity which for actual products is typically in the range of 1 to 100 for any particular product, for moderately sized stores. In contrast, the stock quantity for PLUIDs may be set arbitrarily high to avoid the possibility of the POSCS having a stock value "0" for some PLUID and thereby possibly failing to process that PLUID. Table 1430 shows that the descriptive data associated with each PLUID may be, for example, "coupon" or "discount" or "coupon1" of the like. If different PLUIDs are associated with different manufacturers, then for example the descriptive text could be "[name of manufacturer] coupon" or the like indicating manufacturer.

In one alternative, the POSCS is modified to the extent that its operating code avoids an error condition upon processing, such as totaling, entry of a negative value for a PID in a purchase transaction.

It may be that the POSCS is incapable, for example, of processing a transaction in which the total amount at any point in the processing is less than zero, which is what would occur if the first PID in the total is a PLUID corresponding to a discount value. One option in this situation is to modify the POSCS code to allow for negative values. Another option is to modify the routines of the MCS to delay transmission of PLUIDs to the YCS until after transmission of all or a substantial number of PIDs in a transaction, so that intermediate total cost in the POSCS for PIDs and PLUIDs in the order received by the POSCS never falls below zero.

In one alternative, the POSCS stores PLUIDs in association with positive values for cost, and the POSCS code is modified to the extent of distinguishing PLUIDs from other values in the PID field, and then subtracting the positive cost value in the COST field associated with a PLUID from the transaction total. In this alternative, preferably, the POSCS code is modified to also transmit the negative of the cost value in the COST field associated with that PLUID to the POSCS output.

Figure 16:
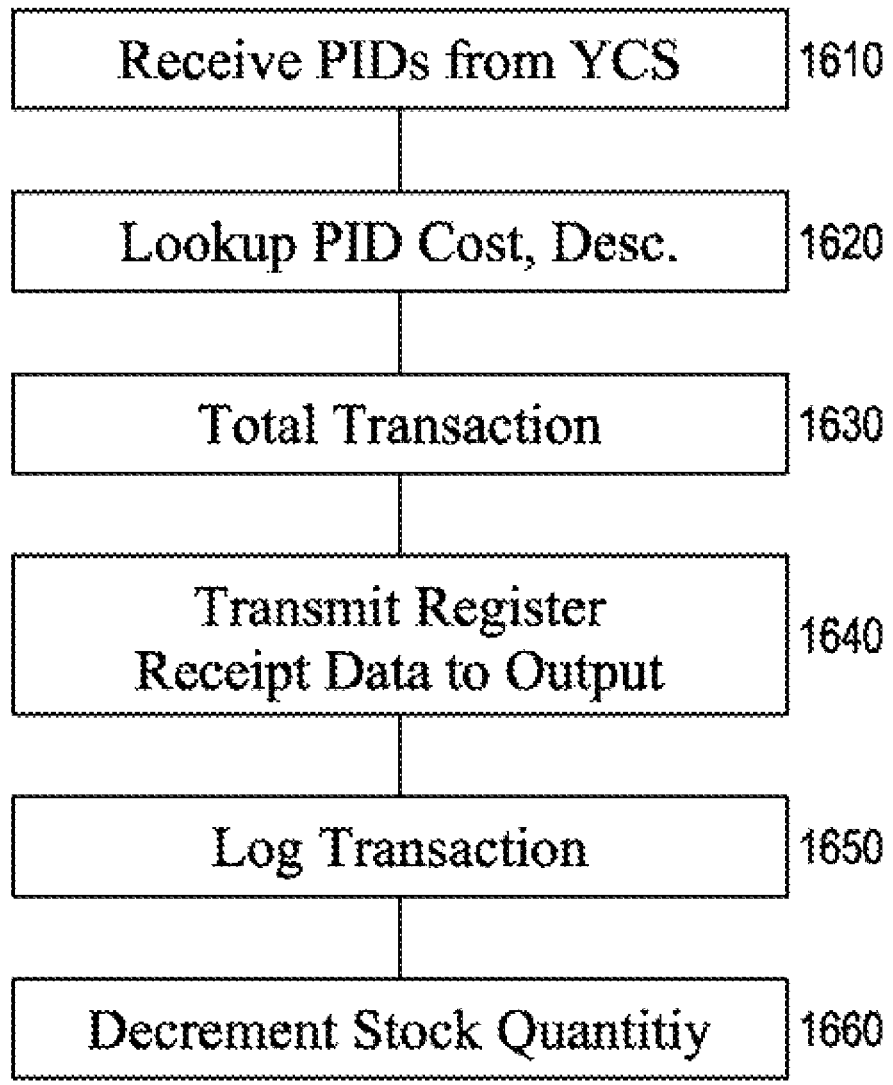
FIG. 16 is flow chart for an embodiment of algorithm executed by the POSCS.

FIG. 16 is flow chart for an embodiment of an algorithm executed by the POSCS when processing a purchase transaction, showing conventional processing.

In step 1610, the POSCS receives PIDs from the YCS.

In step 1620, the POSCS looks up cost and descriptive text from tables 1410 and 1430.

In step 1630, the POSCS totals the cost for the transaction.

In step 1640, the POSCS transmits register receipt print data to the POSCS output, for printing or otherwise distribution to the customer.

In step 1650, the POSCS logs the transaction.

In step 1660, the POSCS decrements its stock quantities by the number of items purchased for each PID, including for PLUIDs.

If during processing of a transaction after a first PLUID has been transmitted from the MCS to the POSCS, an item purchase is voided which would result in the couponID failing validation, the MCS transmits a second PLUID that has the opposite cost value from the first PLUID, thereby voiding the credit initially granted for the corresponding coupon redemption. In the foregoing processing scheme, software in the MCS preferably sets up a set of counters (at least one counter) for each received couponID having validation criteria depending upon data in the same transaction, such as the existence of other PIDs or CIDs in that transaction. In addition, software in the MCS preferably sets up an additional counter for each received couponID indicating if the PLUID for that couponID has been transmitted to the POSCS, and it uses the value of this additional counter to determine if receipt of further PIDs or receipt of further couponIDs should trigger transmission of corresponding PLUIDs to the POSCS.

The MCS stores validation rules to follow in determining whether to provide a coupon to each consumer based upon that consumer's purchases (present purchases and in some embodiments when the consumer's purchase is associated with a consumer identification such as a credit card or frequent shopper card, past purchase transactions and/or present purchase transactions). For example, each couponID may be stored in the MCS in association with a currency amount (discount value), a first product identification, an integer associated with the first product identification (used to determine the number of first product items required to be purchased to entitle the consumer to the discount), and optionally additional product identifications and additional integers requiring purchase of the number of additional products for the purchase transaction to qualify for the discount associated with the coupon. This allows the MCS to respond to receipt of a couponID to set up counters associated with receipt by the MCS of product identifications and initial values (the integers), associated with the coupon. If the MCS receives a consumer identification, this determination may also include lookup in a historical table for that identification to see if associated therewith are any couponIDs and marketing material identifications In addition, in the MCS preferably stores a Discount/PLUID table associating coupon credit amounts with one or more PLUIDs, or with an integer and one or more PLUIDs. This allows the MCS to respond to receipt of a couponID by looking up the PLUID or set of PLUIDs that will result in providing the discount associated with the coupon to the transaction total generated by the POSCS.

Alternatively, one printer is capable of receiving and queuing print instructions from both the POSCS and the MCS, and both the POSCS and the MCS have outputs coupled to that printer.

On one embodiment, the coupons are presented by the consumer into a coupon reading machine which includes an additional bar code reader and which securely keeps the coupons so that the coupons are not available to the store clerk or the consumer after the coupons are scanned. Alternatively, the reading machine shreds the coupons upon their validation and use in a transaction. Alternatively, the reading machine prints on the coupons so that they cannot be read again by a scanner to determine their couponID. Alternatively, the reading machine prints additional code into the bar code so that each coupon identifies itself to any scanner as one that has already been used in a purchase transaction. These alternatives are to prevent fraudulent reuse of a once used coupon.

In an alternative embodiment, the YCS is absent, and the MCS receives ID data directly from the scanner and forwards ID data directly to the POSCS. This system preferably contains elements for processing purchase transactions in a retail store comprising: a scanner configured to scan product identifications and couponIDs; an MCS; a POSCS; a first data communication line from an output of said MCS to an input of said POSCS; a printer; a second data communication line from an output of said POSCS to both an input of the printer and an input of said CMS; code in said MCS for determining whether to transmit coupon discount information via said first data communication line to said POSCS, based upon data transmitted from said scanner and received in said MCS during a first purchase transaction; code in said MCS for transmitting product identification information transmitted from said scanner and received in said MCS during said first purchase transaction, to said POSCS; code in said MCS for not transmitting couponID information transmitted from said scanner and received in said MCS during said first purchase transaction, to said POSCS; code in said POSCS for totaling charges for product items and coupon discount information received in said POSCS during said first purchase transaction; code in said POSCS for transmitting print data for printing a register receipt containing purchase transaction to said second data communication line; code in said MCS for transmitting to a printer print instructions for printing coupons and/or marketing material in response to receipt of said print data for printing a register receipt.

The elements having corresponding functions in the embodiments and alternatives described above are interchangeable between embodiments and alternatives.

While various specific embodiments have been described, the scope of protection sought is defined by the claims.

We claim:

1. A system for processing transactions for a retail store comprising:
    a bar code scanner for reading IDs represented by bar codes, said bar code scanner located at a POS of said retail store;
    a Y device including a YCS, said YCS comprising a YCS CPU and YCS memory;
    an MCS, said MCS comprising an MCS CPU and MCS memory;
    a POSCS, said POSCS comprising a POSCS CPU and POSCS memory;
    a POS printer, said POS printer located at said POS;
    wherein said Y device has one input coupled to said bar code scanner, one I/O coupled to said MCS, and one output coupled to said POSCS;
    said POSCS has an output coupled to said POS printer; and
    wherein said Y device routes data defining IDs read by said bar code scanner to said MCS, transmits IDs received from said MCS to said POSCS, and transmits data defining the IDs read by said bar code scanner to said POSCS if said YCS determines that said MCS is non responsive to data sent from said YCS to said MCS;
    wherein said MCS receives IDs from said YCS or said scanner, transmits IDs to said YCS such that, if an ID received by said MCS is a PID, said MCS transmits the same ID to said YCS, and if the ID received by said MCS is a couponID, said MCS transmits a PLUID associated in said MCS memory with said couponID, to said YCS, and wherein said PLUID and said couponID are different from one another;
    wherein said POSCS stores in said POSCS memory cost values in association with PLUIDs and cost values in association with PIDs, and totals the cost for a transaction including a specified PLUID using the corresponding cost value stored in said POSCS memory for that specified PLUID; and
    wherein, if an ID received by said MCS from said YCS is a CID, the MCS is configured to not transmit said ID back to said YCS.

2. The system of claim 1 wherein said MCS transmits PLUIDs to said YCS in the same digital specification for alphanumeric or numeric information in which the MCS transmits PIDs to said YCS.

3. The system of claim 1 wherein said Y device is a Y cable, said Y cable has one end mechanically connected to said bar code scanner to couple said Y device to said bar code scanner, one end mechanically connected to said MCS to couple said Y device to said MCS, and one end mechanically connected to said POSCS to couple said Y device to said POSCS.

4. The system of claim 1 further comprising an MCS printer connected to the MCS and configured for printing marketing communications.

5. The system of claim 1 further comprising a customer input device connected to said MCS for receiving input from a customer at the POS.

6. A system for processing transactions for a retail store comprising:
    a bar code scanner for reading IDs represented by bar codes, said bar code scanner located at a POS of said retail store;
    a Y device including a YCS, said YCS comprising a YCS CPU and YCS memory;
    an MCS, said MCS comprising an MCS CPU and MCS memory;
    a POSCS, said POSCS comprising a POSCS CPU and POSCS memory;
    a POS printer, said POS printer located at said POS;
    wherein said Y device has one input coupled to said bar code scanner, one I/O coupled to said MCS, and one output coupled to said POSCS;
    said POSCS has an output coupled to said POS printer; and
    wherein said Y device routes data defining IDs read by said bar code scanner to said MCS, transmits IDs received from said MCS to said POSCS, and transmits data defining the IDs read by said bar code scanner to said POSCS if said YCS determines that said MCS is non responsive to data sent from said YCS to said MCS;
    wherein said MCS receives IDs from said YCS or said scanner, transmits IDs to said YCS such that, if an ID received by said MCS is a PID, said MCS transmits the same ID to said YCS, and if the ID received by said MCS is a couponID, said MCS transmits a PLUID associated in said MCS memory with said couponID, to said YCS, and wherein said PLUID and said couponID are different from one another;
    wherein said POSCS stores in said POSCS memory cost values in association with PLUIDs and cost values in association with PIDs, and totals the cost for a transaction including a specified PLUID using the corresponding cost value stored in said POSCS memory for that specified PLUID; and wherein, if an ID received by said MCS from said YCS is a CID, said MCS is configured to instruct said YCS to not transmit said ID to said POSCS.

7. The system of claim 6 wherein said MCS transmits PLUIDs to said YCS in the same digital specification for alphanumeric or numeric information in which the MCS transmits PIDs to said YCS.

8. The system of claim 6 wherein said Y device is a Y cable, said Y cable has one end mechanically connected to said bar code scanner to couple said Y device to said bar code scanner, one end mechanically connected to said MCS to couple said Y device to said MCS, and one end mechanically connected to said POSCS to couple said Y device to said POSCS.

9. The system of claim 6 further comprising an MCS printer connected to the MCS and configured for printing marketing communications.

10. The system of claim 6 further comprising a customer input device connected to said MCS for receiving input from a customer at the POS.

11. A system for processing transactions for a retail store comprising:
a bar code scanner for reading IDs represented by bar codes, said bar code scanner located at a POS of said retail store;
a Y device including a YCS, said YCS comprising a YCS CPU and YCS memory;
an MCS, said MCS comprising an MCS CPU and MCS memory;
a POSCS, said POSCS comprising a POSCS CPU and POSCS memory;
a POS printer, said POS printer located at said POS;
wherein said Y device has one input coupled to said bar code scanner, one I/O coupled to said MCS, and one output coupled to said POSCS;
said POSCS has an output coupled to said POS printer; and
wherein said Y device routes data defining IDs read by said bar code scanner to said MCS, transmits IDs received from said MCS to said POSCS, and transmits data defining the IDs read by said bar code scanner to said POSCS if said YCS determines that said MCS is non responsive to data sent from said YCS to said MCS;
wherein said MCS receives IDs from said YCS or said scanner, transmits IDs to said YCS such that, if an ID received by said MCS is a PID, said MCS transmits the same ID to said YCS, and if the ID received by said MCS is a couponID, said MCS transmits a PLUID associated in said MCS memory with said couponID, to said YCS, and wherein said PLUID and said couponID are different from one another; and
wherein said POSCS stores in said POSCS memory cost values in association with PLUIDs and cost values in association with PIDs, and totals the cost for a transaction including a specified PLUID using the corresponding cost value stored in said POSCS memory for that specified PLUID; and
wherein said MCS memory stores plural couponID each in association with a PLUID, and wherein the number of distinct couponIDs exceeds the number of distinct PLUIDs.

12. The system of claim 11 wherein said MCS transmits PLUIDs to said YCS in the same digital specification for alphanumeric or numeric information in which the MCS transmits PIDs to said YCS.

13. The system of claim 11 wherein said Y device is a Y cable, said Y cable has one end mechanically connected to said bar code scanner to couple said Y device to said bar code scanner, one end mechanically connected to said MCS to couple said Y device to said MCS, and one end mechanically connected to said POSCS to couple said Y device to said POSCS.

14. The system of claim 11 further comprising an MCS printer connected to the MCS and configured for printing marketing communications.

15. The system of claim 11 further comprising a customer input device connected to said MCS for receiving input from a customer at the POS.

16. A system for processing transactions, comprising:
a marketing computer system; and
a Y computer system coupled to the marketing computer system, the Y computer system configured to:
receive an identification that was read by a bar code scanner, and
communicate the identification to the marketing computer system;
wherein the marketing computer system is configured to:
determine whether the identification is associated with a product identification or a coupon identification,
when the identification is associated with the product identification, communicate the identification back to the Y computer system, and
when the identification is associated with the coupon identification, determine a price lookup identification associated with the coupon identification and communicate the price lookup identification to the Y computer system, wherein the price lookup identification is associated with a discount;
wherein the Y computer system is further configured to:
communicate the identification received from the marketing computer system or the price lookup identification received from the marketing computer system.

17. The system of claim 16, wherein the Y computer system is configured to communicate the identification or the price lookup identification to a point of sale computer device.

18. The system of claim 17, wherein the marketing computer system is further configured to:
determine whether the identification is associated with a consumer identification; and
when the identification is associated with the consumer identification, not communicate the identification to the Y computer or instruct the Y computer system to not transmit the identification to the point of sale computer device.

19. A method for processing transactions, comprising:
receiving, by a Y computer system, an identification that was read at a bar code scanner;
communicating, by the Y computer system, the identification to a marketing computer system;
determining, by the marketing computer system, whether the identification is associated with a product identification or a coupon identification;
when the identification is associated with the product identification, communicating, by the marketing computer system, the identification back to the Y computer system;
when the identification is associated with the coupon identification, determining, by the marketing computer system, a price lookup identification associated with the coupon identification and communicating the price lookup identification to the Y computer system, wherein the price lookup identification is associated with a discount; and communicating, by the Y computer system, the identification received from the marketing computer system or the price lookup identification received from the marketing computer system.

20. The method of claim 19, wherein communicating the identification received from the marketing computer system or the price lookup identification received from the marketing computer system comprises communicating the identification or the price lookup identification to a point of sale computer device.

21. The method of claim 20, further comprising:

determining, by the marketing computer system, whether the identification is associated with a consumer identification; and when the identification is associated with the consumer identification, not communicating the identification to the Y computer or instructing the Y computer system to not transmit the identification to the point of sale computer device.

* * * * *